United States Patent
Krivoruchko et al.

(10) Patent No.: US 12,124,674 B2
(45) Date of Patent: Oct. 22, 2024

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Evgenii Krivoruchko, Cupertino, CA (US); Israel Pastrana Vicente, Spring, TX (US); Stephen O. Lemay, Palo Alto, CA (US); Christopher D. McKenzie, Burlingame, CA (US); Zoey C. Taylor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/948,096

(22) Filed: Sep. 19, 2022

(65) Prior Publication Data

US 2023/0092874 A1 Mar. 23, 2023

Related U.S. Application Data

(60) Provisional application No. 63/247,241, filed on Sep. 22, 2021.

(51) Int. Cl.
| | |
|---|---|
| G06F 3/04815 | (2022.01) |
| G06F 3/01 | (2006.01) |
| G06F 3/04845 | (2022.01) |

(52) U.S. Cl.
CPC .......... *G06F 3/04815* (2013.01); *G06F 3/012* (2013.01); *G06F 3/013* (2013.01); *G06F 3/017* (2013.01); *G06F 3/04845* (2013.01)

(58) Field of Classification Search
CPC ...... G06F 3/04815; G06F 3/012; G06F 3/013; G06F 3/017; G06F 3/04845
See application file for complete search history.

(56) References Cited

U.S. PATENT DOCUMENTS

| | | | |
|---|---|---|---|
| 9,619,105 B1 | 4/2017 | Dal Mutto | |
| 11,650,658 B2 * | 5/2023 | Babu | G06T 1/20 345/156 |

(Continued)

FOREIGN PATENT DOCUMENTS

WO   WO 2020/247256 A1   12/2020

OTHER PUBLICATIONS

Andrew T. Duchowski, Gaze-based interaction: A 30 year retrospective, Computers & Graphics, vol. 73, 2018, pp. 59-69, ISSN 0097-8493, https://doi.org/10.1016/j.cag.2018.04.002. <URL=(https://www.sciencedirect.com/science/article/pii/S0097849318300487)> (Year: 2018).*

(Continued)

*Primary Examiner* — James T Tsai
(74) *Attorney, Agent, or Firm* — Morgan, Lewis & Bockius LLP

(57) ABSTRACT

A computer system detects whether the user satisfies attention criteria with respect to a first user interface object displayed in a first view of a three-dimensional environment. In response to detecting that the user does not satisfy the attention criteria with respect to the first user interface object, the computer system displays the first user interface object with a modified appearance. The computer system detects a first movement of a viewpoint of the user relative to a physical environment and detects that the user satisfies the attention criteria with respect to the first user interface object. In response, the computer system displays the first user interface object in a second view of the three-dimensional environment, including displaying the first user interface object with an appearance that emphasizes the first user interface object more than when the first user interface object was displayed with the modified appearance.

57 Claims, 13 Drawing Sheets

(56) References Cited

U.S. PATENT DOCUMENTS

| | | | | |
|---|---|---|---|---|
| 2007/0266336 | A1* | 11/2007 | Nojima | G06F 3/0486 |
| | | | | 715/792 |
| 2012/0075168 | A1* | 3/2012 | Osterhout | G06F 3/017 |
| | | | | 345/8 |
| 2015/0035822 | A1* | 2/2015 | Arsan | G06T 19/006 |
| | | | | 345/419 |
| 2017/0039765 | A1 | 2/2017 | Zhou et al. | |
| 2017/0358141 | A1* | 12/2017 | Stafford | G06T 7/246 |
| 2018/0350119 | A1* | 12/2018 | Kocharlakota | G06F 3/012 |
| 2020/0225813 | A1* | 7/2020 | Schwarz | G06F 3/017 |
| 2021/0327146 | A1* | 10/2021 | Buerli | G06F 3/04815 |
| 2022/0254120 | A1* | 8/2022 | Berliner | G06F 3/14 |
| 2022/0413609 | A1* | 12/2022 | Mounier | G06F 3/011 |
| 2023/0106627 | A1 | 4/2023 | Dascola et al. | |
| 2023/0129718 | A1* | 4/2023 | Yang | G06F 3/0482 |
| | | | | 463/31 |
| 2023/0315202 | A1* | 10/2023 | Poulos | G06F 3/014 |
| | | | | 345/156 |
| 2023/0333642 | A1* | 10/2023 | Chimalamarri | G06F 3/013 |

OTHER PUBLICATIONS

Office Action, dated Jun. 3, 2024, received in U.S. Appl. No. 17/949,117, 7 pages.

International Search Report and Written Opinion, dated Mar. 3, 2023, received in International Application No. PCT/US2022/044117, which corresponds with U.S. Appl. No. 17/948,096, 26 pages.

Invitation to Pay Additional Fees, dated Jan. 20, 2023, received in International Patent Application No. PCT/US2022/044350, which corresponds with U.S. Appl. No. 17/949,117, 16 pages.

International Search Report and Written Opinion, dated Mar. 15, 2023, received in International Patent Application No. PCT/US2022/044350, which corresponds with U.S. Appl. No. 17/949,117, 22 pages.

Notice of Allowance, dated Sep. 12, 2024, received in U.S. Appl. No. 17/949,117, 25 pages.

* cited by examiner

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Application Ser. No. 63/247,241, filed Sep. 22, 2021, which is incorporated by reference herein in its entirety.

TECHNICAL FIELD

This disclosure relates generally to computer systems with a display generation component and one or more input devices that provide computer-generated extended reality (XR) experiences, including but not limited to electronic devices that provide virtual reality and mixed reality experiences via a display generation component.

BACKGROUND

The development of computer systems for virtual reality, augmented reality, and extended reality has increased significantly in recent years. Example augmented reality and extended reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented/extended reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, virtual reality environments, and extended reality environments) are cumbersome, inefficient, and limited. For example, systems that provide insufficient feedback for performing actions associated with virtual objects, systems that require a series of inputs to achieve a desired outcome in a virtual/augmented/extended reality environment, and systems in which manipulation of virtual objects are complex, tedious and error-prone, create a significant cognitive burden on a user, and detract from the experience with the virtual/augmented/extended reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing extended reality experiences to users. Such methods and interfaces reduce the number, extent, and/or nature of the inputs from a user by helping the user to understand the connection between provided inputs and device responses to the inputs, thereby creating a more efficient human-machine interface.

In accordance with some embodiments, a method is performed at a computer system that is in communication with a first display generation component and one or more input devices. The method includes displaying, via the first display generation component, a first user interface object in a first view of a three-dimensional environment. The method further includes, while displaying the first user interface object, detecting, via the one or more input devices, whether the user satisfies attention criteria with respect to the first user interface object. The method further includes, in response to detecting that the user does not satisfy the attention criteria with respect to the first user interface object, displaying the first user interface with a modified appearance, wherein displaying the first user interface object with the modified appearance includes deemphasizing the first user interface object relative to one or more other objects in the three-dimensional environment. The method further includes, while displaying the first user interface object with the modified appearance, detecting, via the one or more input devices, a first movement of a viewpoint of the user relative to a physical environment. The method further includes, after detecting the first movement of the viewpoint of the user relative to the physical environment, detecting that the user satisfies the attention criteria with respect to the first user interface object. The method further includes, in response to detecting that the user satisfies the attention criteria, displaying the first user interface object in a second view of the three-dimensional environment distinct from the first view of the three-dimensional environment, wherein displaying the first user interface object in the second view of the three-dimensional environment includes displaying the first user interface object with an appearance that emphasizes the first user interface object relative to one or more other objects in the three-dimensional environment more than when the first user interface object was displayed with the modified appearance.

In some embodiments, a method is performed at a computer system that is in communication with a first display generation component and one or more input devices. The method includes displaying, via the first display generation component, a first user interface object in a first view of a three-dimensional environment at a first position in the three-dimensional environment and a first spatial arrangement relative to a respective portion of the user. The method further includes, while displaying the first user interface object, detecting, via the one or more input devices, movement of a viewpoint of the user from a first location to a second location in a physical environment. The method further includes, in response to detecting the movement of the viewpoint of the user from the first location to the second location: in accordance with a determination that the movement of the viewpoint of the user from the first location to the second location does not satisfy a threshold amount of movement, maintaining display of the first user interface object at the first position in the three-dimensional environment. The method further includes, in response to detecting the movement of the viewpoint of the user from the first location to the second location, in accordance with a determination that the movement of the viewpoint of the user from the first location to the second location satisfies the threshold amount of movement: ceasing to display the first user interface object at the first position in the three-dimensional environment and displaying the first user interface object at a second position in the three-dimensional environment, wherein the second position in the three-dimensional environment has the first spatial arrangement relative to the respective portion of the user.

In accordance with some embodiments, a computer system includes or is in communication with a display generation component (e.g., a display, a projector, or a head-mounted display), one or more input devices (e.g., one or more cameras, a touch-sensitive surface, optionally one or more sensors to detect intensities of contacts with the touch-sensitive surface), optionally one or more audio output components, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more audio output components, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The present disclosure relates to user interfaces for providing a computer generated extended reality (XR) experience to a user, in accordance with some embodiments.

The systems, methods, and GUIs described herein improve user interface interactions with virtual/augmented reality environments in multiple ways.

In some embodiments, a computer system displays a user interface element that is visually deemphasized while the user is not paying attention to the user interface element. The user interface element remains deemphasized as the user moves around in the physical environment, and in accordance with a determination that the user is paying attention to the user interface element, the user interface element is no longer visually deemphasized and is displayed for the user at a position within the three-dimensional environment based on the user's current view of the three-dimensional environment.

In some embodiments, a computer system is provided that displays a user interface element in a three-dimensional environment, where display of the user interface element is updated to follow the user as the user changes the user's current view of the three-dimensional environment (e.g., by moving around a physical environment). The user interface element initially does not move as the user's view changes, until the user's view has changed by more than a threshold amount. After the user's view has changed by more than the threshold amount, the user interface element follows the user (e.g., is delayed in following and/or follows the user at a slower rate of movement than the movement of the user).

FIGS. 1-6 provide a description of example computer systems for providing XR experiences to users. The user interfaces in FIGS. 7A-7J are used to illustrate the processes in FIGS. 8-9, respectively.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or haptic feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Figure 1:
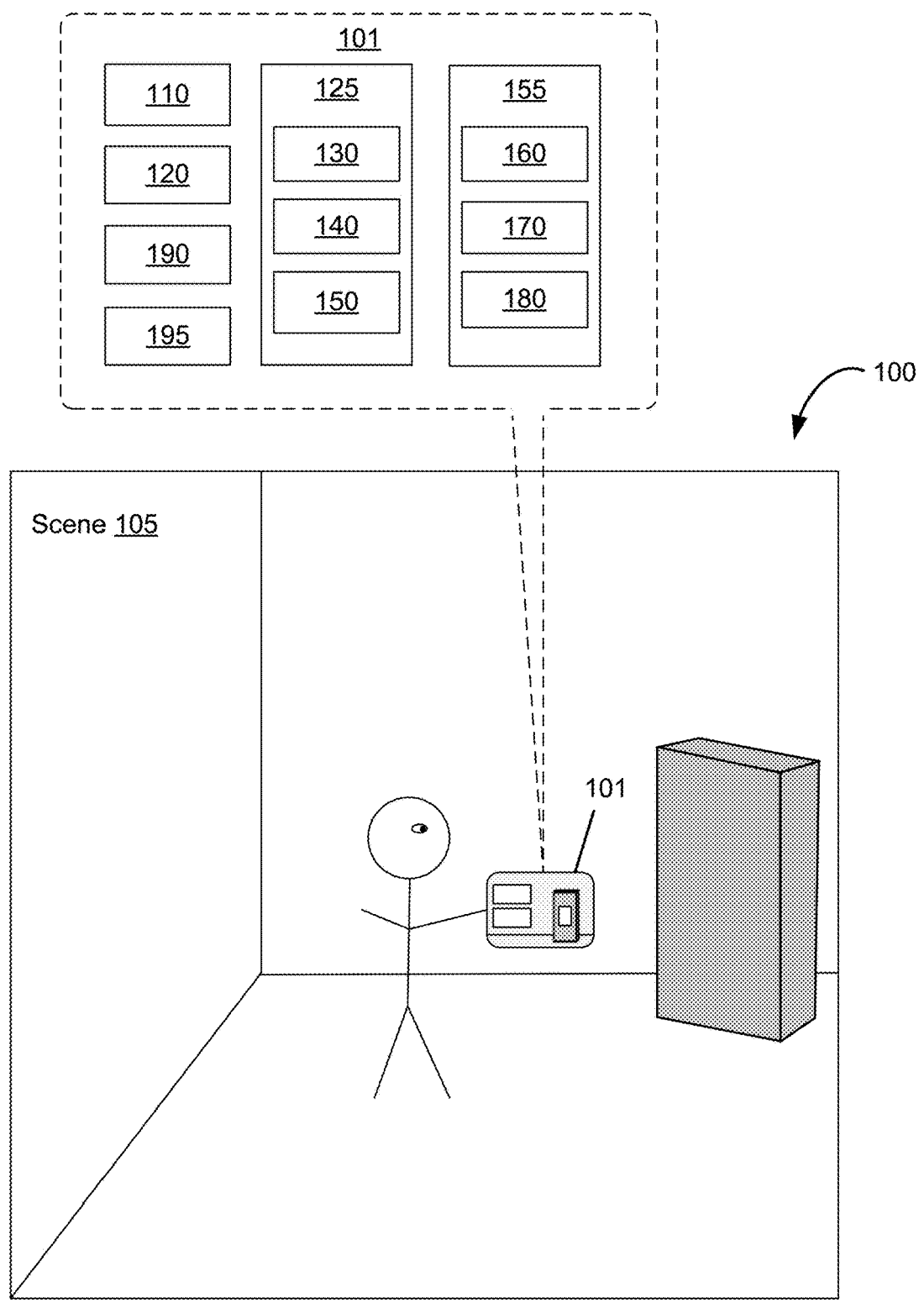
FIG. 1 is a block diagram illustrating an operating environment of a computer system for providing extended-reality (XR) experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, and/or a touch-screen), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, and/or velocity sensors), and optionally one or more peripheral devices 195 (e.g., home appliances, and/or wearable devices). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended-reality: In contrast, a extended-reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, and/or another server). In some embodiments, the controller 110 is communicatively coupled with the display generation component 120 (e.g., an HMD, a display, a projector, and/or a touch-screen) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, and/or on his/her hand). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
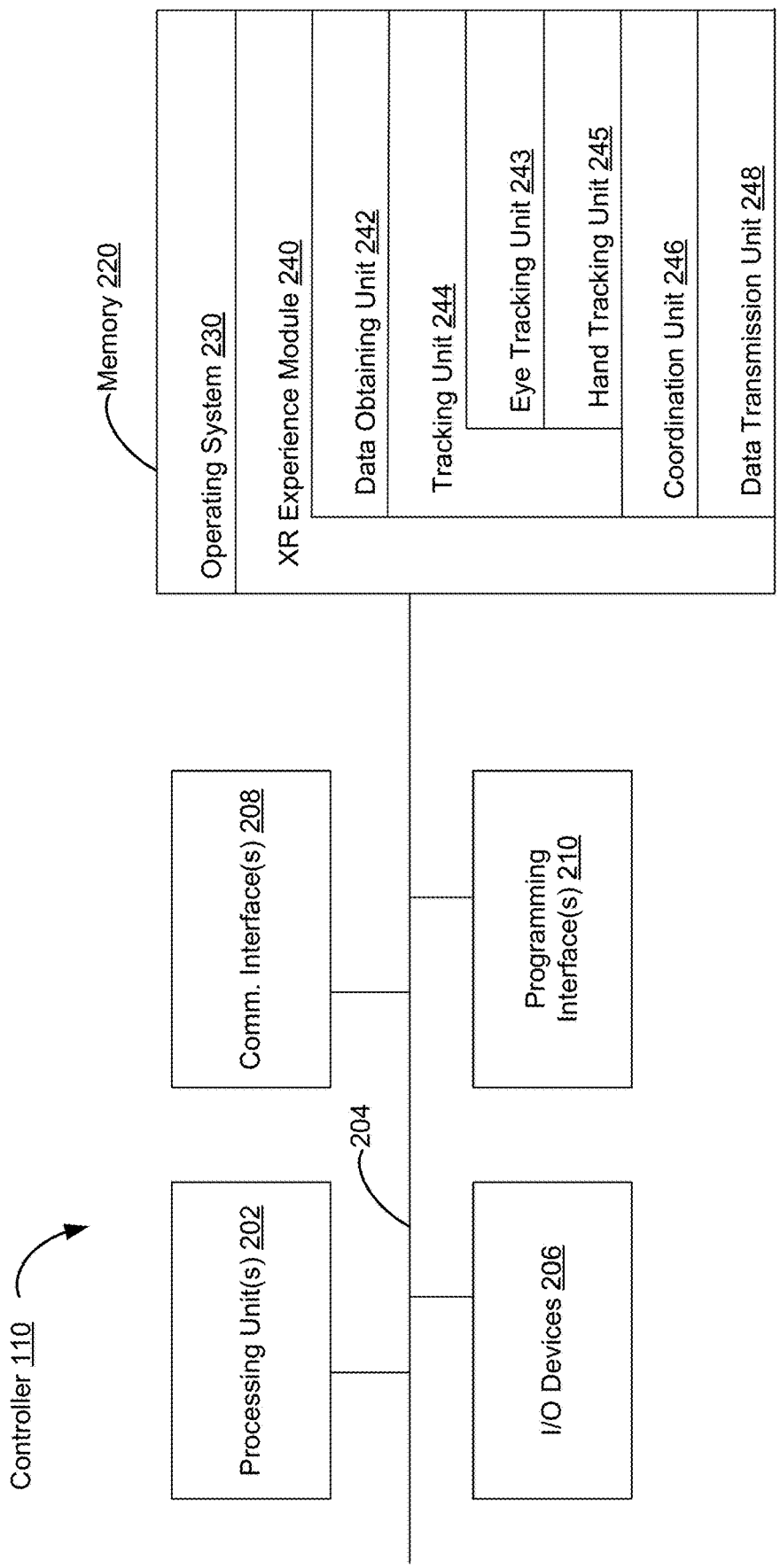
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, and/or location data) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data and/or location data) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
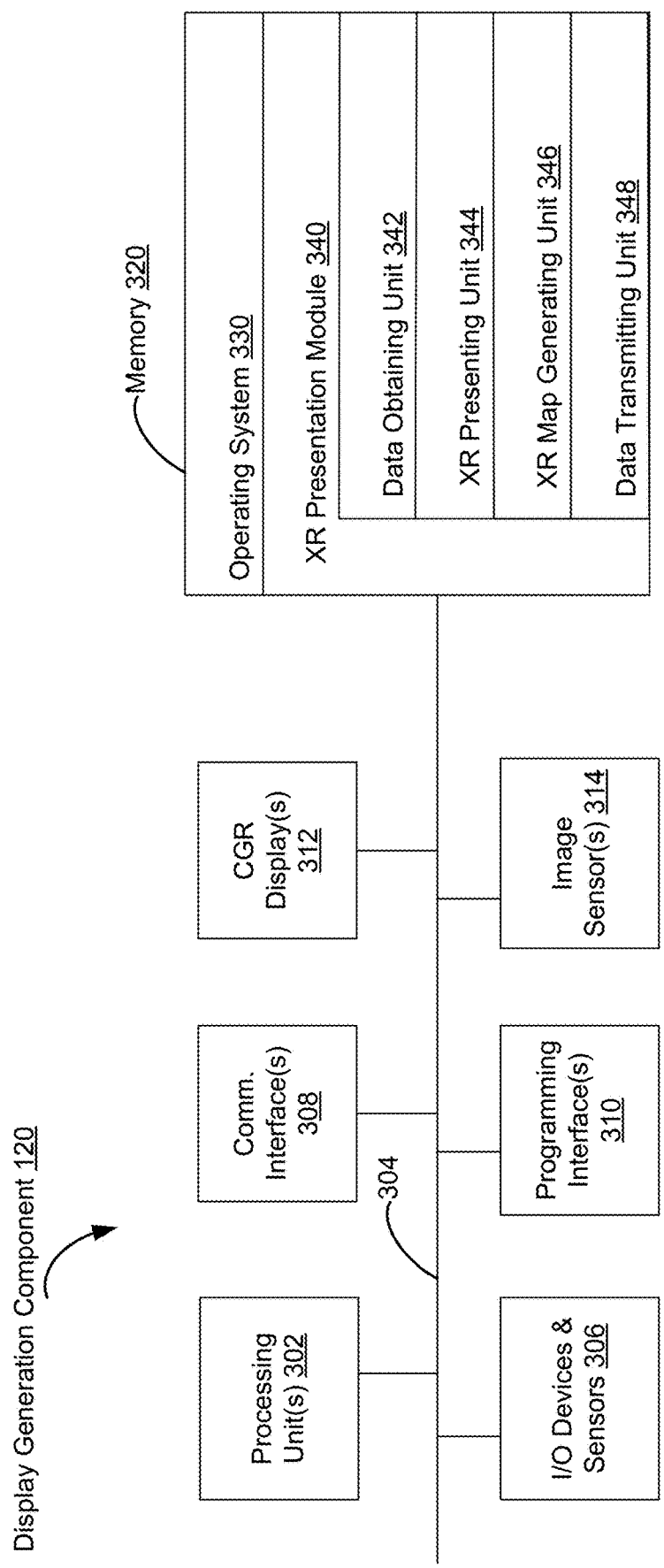
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, and/or blood glucose sensor), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the HMD 120 includes a single XR display. In another example, the HMD 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, and/or location data) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data and/or location data) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
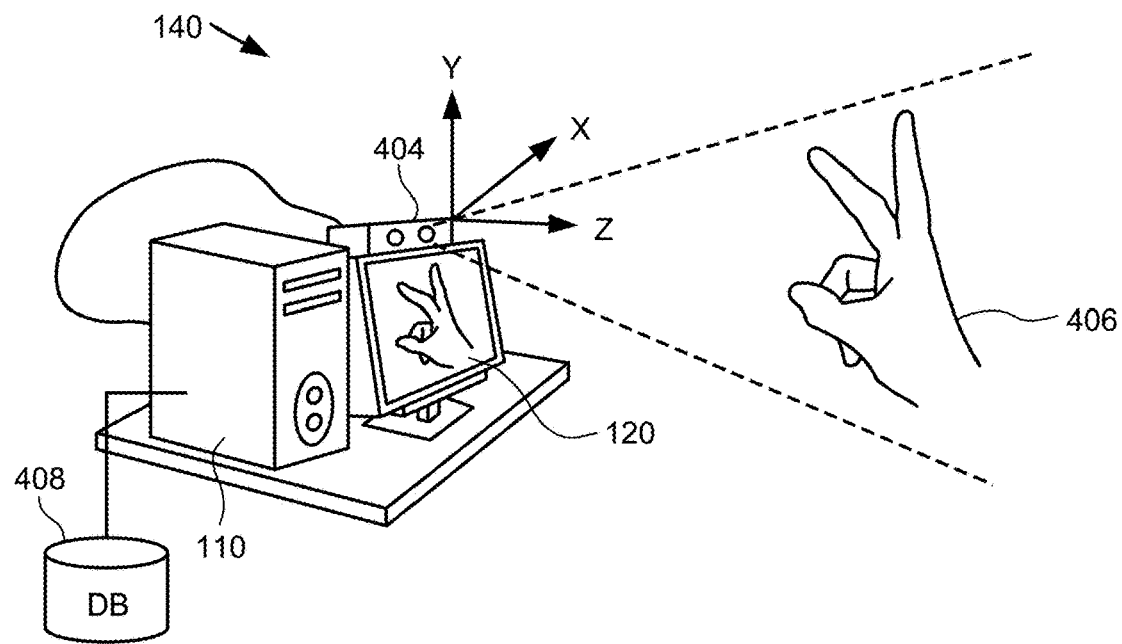
FIG. 4 is a block diagram illustrating a hand tracking unit of a computer system that is configured to capture gesture inputs of the user in accordance with some embodiments.
Figure 4:
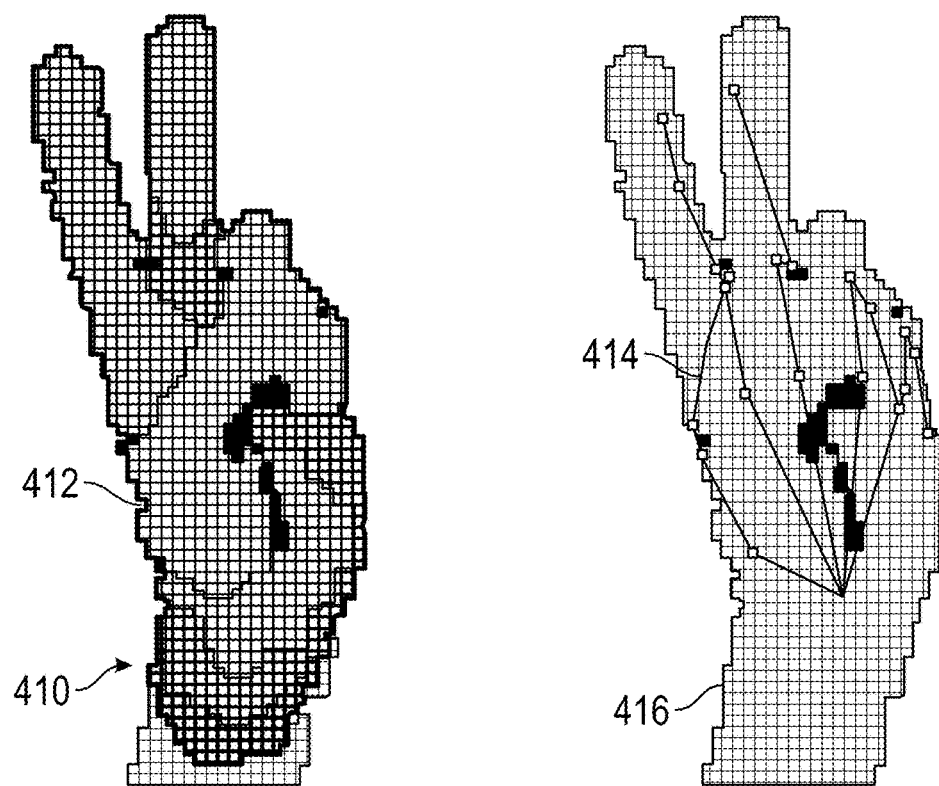

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, and/or end of the hand connecting to wrist) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
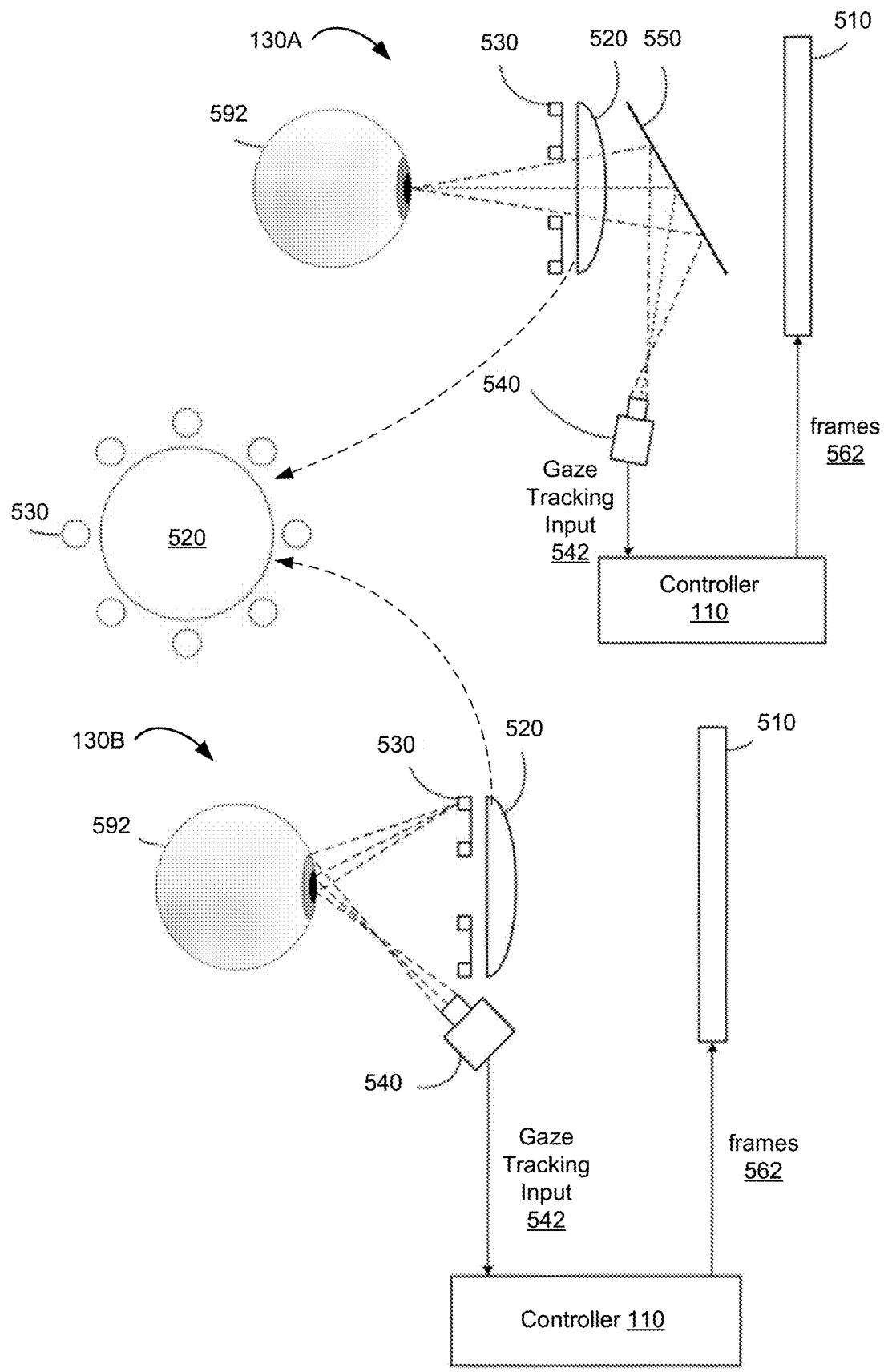
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, and/or a projector) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in extended-reality (e.g., including virtual reality, and/or mixed reality) applications to provide extended-reality (e.g., including virtual reality, augmented reality, and/or augmented virtuality) experiences to the user.

Figure 6:
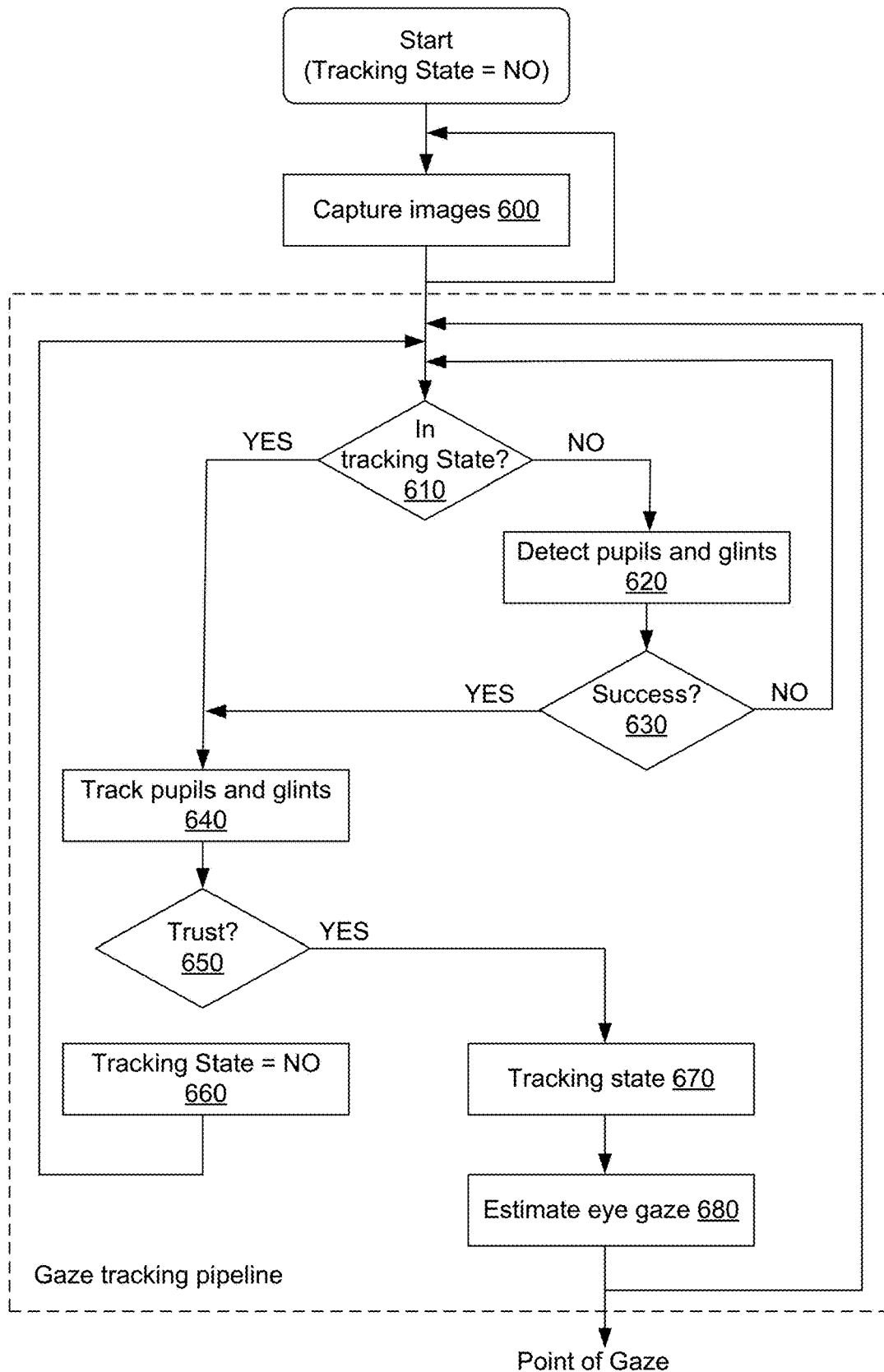
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7J illustrate three-dimensional environments displayed via a display generation component (e.g., a display generation component 7100, or a display generation component 120) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, and/or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, selected by a concurrently and/or previously detected gesture input). In some embodiments, an input is directed to a virtual object within a three-dimensional environment by an input device that has positioned a focus selector object (e.g., a pointer object or a selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand movement (e.g., whole hand movement, whole hand movement in a respective posture, movement of one portion of hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, or transitioning between different levels of immersion with which visual content is being displayed) in accordance with inputs from other computers used by other users that are sharing the computer-generated environment with the user of the computer system (e.g., in a shared computer-generated experience, in a shared virtual environment, or in a shared virtual or augmented reality environment of a communication session). In some embodiments, the computer system displays some changes in the three-dimensional environment (e.g., displaying movement, deformation, changes in visual characteristics, etc. of a user interface, a virtual surface, a user interface object, and/or virtual scenery) in accordance with inputs from sensors that detects movement of other persons and objects and movement of the user that may not quality as a recognized gesture input for triggering an associated operation of the computer system.

In some embodiments, a three-dimensional environment that is displayed via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environment (e.g., transitions between presenting a computer-generated environment or experience with different levels of immersion, or adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed. In some embodiments, the pass-through portion of the display generation component is a transparent or semi-transparent (e.g., see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in placed of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and blocks the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), etc., relative to the physical environment cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in FIGS. 7B-7J, the views of a three-dimensional environment sometimes do not include representation(s) of a user's hand(s), arm(s), and/or wrist(s). In some embodiments, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more camera's pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency, and/or a simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole, etc.

FIGS. 7A-7J are block diagrams illustrating user interactions with user interface objects displayed in a three-dimensional environment, in accordance with some embodiments. In some embodiments, one or more of the user interface objects are provided within a predefined zone in the three-dimensional environment, such that user interface objects placed in the predefined zone follow the user in the three-dimensional environment, whereas user interface objects placed outside of the predefined zone do not follow the user in the three-dimensional environment (e.g., user interface objects placed outside of the predefined zone are anchored to the three-dimensional environment). Behaviors described in FIGS. 7A-7J (and FIGS. 8-9) with respect to user interface objects in some examples are applicable to user interface objects in other examples, in accordance with various embodiments, unless stated otherwise in the descriptions.

FIGS. 7A-7J show an exemplary computer system (e.g., device 101, or another computer system) that is in communication with a first display generation component (e.g., display generation component 7100, or another display generation component). In some embodiments, the first display generation component is a heads-up display. In some embodiments, the first display generation component is a head-mounted display (TIMID). In some embodiments, the first display generation component is a standalone display, a touchscreen, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and body as a whole, etc. of the user. In some embodiments, the one or more input devices include an eye tracking component that detects location and movement of the user's gaze. In some embodiments, the first display generation component, and optionally, the one or more input devices and the computer system, are parts of a head-mounted device (e.g., an HMD, or a pair of goggles) that moves and rotates with the user's head in the physical environment, and changes the viewpoint of the user into the three-dimensional environment provided via the first display generation component. In some embodiments, the first display generation component is a heads-up display that does not move or rotate with the user's head or the user's body as a whole, but, optionally, changes the viewpoint of the user into the three-dimensional environment in accordance with the movement of the user's head or body relative to the first display generation component. In some embodiments, the first display generation component is optionally moved and rotated by the user's hand relative to the physical environment or relative to the user's head, and changes the viewpoint of the user into the three-dimensional environment in accordance with the movement of the first display generation component relative to the user's head or face or relative to the physical environment.

FIGS. 7A-7E are block diagrams that illustrate displaying a user interface object 7104 (e.g., user interface objects 7104-1 through 7104-3 are instances of user interface object 7104) at respective positions in a three-dimensional environment that correspond to a location relative to a user 7002 (e.g., the user's viewpoint) in a physical environment 7000.

Figures 7A, 7B:
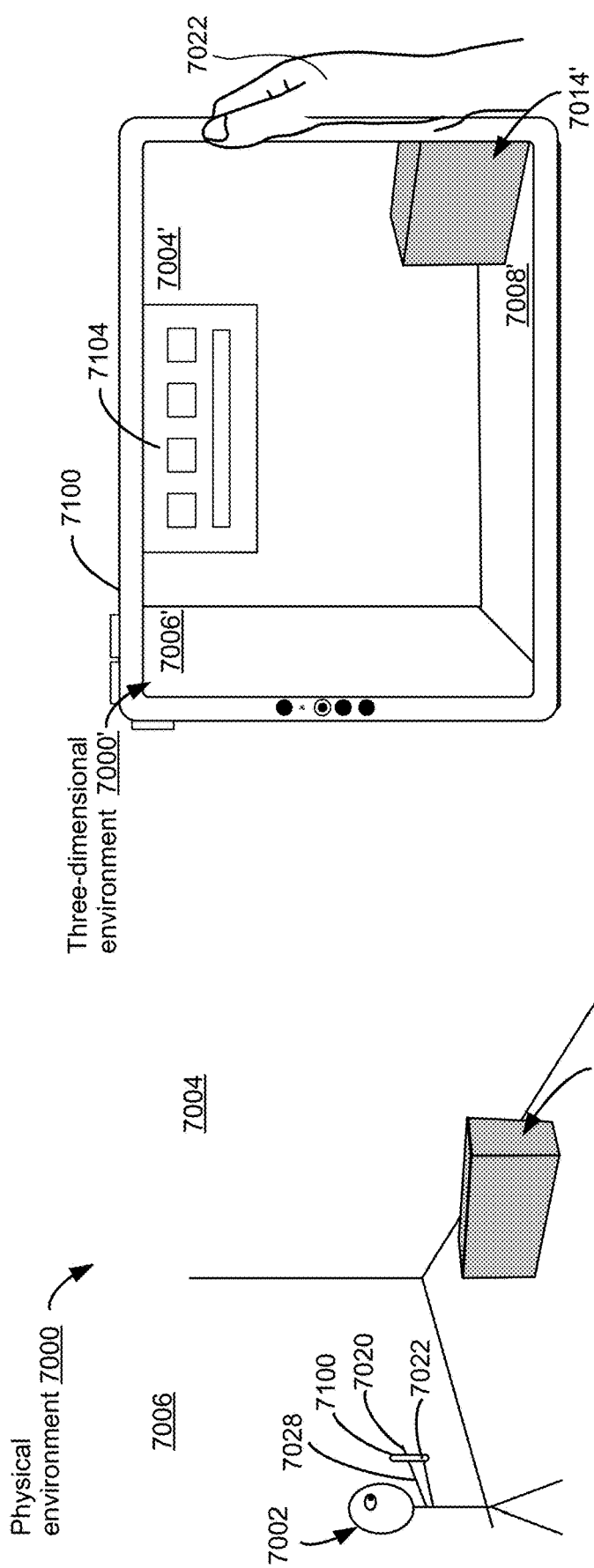
FIGS. 7A-7J are block diagrams that illustrate displaying a user interface object at respective positions in a three-dimensional environment, in accordance with some embodiments.

For example, FIG. 7A illustrates a physical environment 7000 that includes the user 7002 interacting with display generation component 7100. In the examples described below, the user 7002 uses one or both of their two hands, hand 7020 and hand 7022, to provide inputs or instructions to a computer system. In some of the examples described below, the computer system also uses the position or movement of an arm of the user, such as the user's left arm 7028, which is connected to the user's left hand 7020, as part of an input provided by the user to the computer system. The physical environment 7000 includes a physical object 7014, and physical walls 7004 and 7006. The physical environment 7000 further includes a physical floor 7008.

As shown in FIG. 7B, the computer system (e.g., display generation component 7100) displays a view of a three-dimensional environment (e.g., environment 7000', a virtual three-dimensional environment, an augmented reality environment, a pass-through view of a physical environment, or a camera view of a physical environment). In some embodiments, the three-dimensional environment is a virtual three-dimensional environment without a representation of a physical environment 7000. In some embodiments, the three-dimensional environment is a mixed reality environment that is a virtual environment that is augmented by sensor data corresponding to the physical environment 7000. In some embodiments, the three-dimensional environment is an augmented reality environment that includes one or more virtual objects (e.g., user interface object 7104) and a representation of at least a portion of a physical environment (e.g., representations 7004', 7006' of walls, representation 7008' of a floor, and representation 7014' of a physical object) surrounding the display generation component 7100. In some embodiments, the representation of the physical environment includes a camera view of the physical environment. In some embodiments, the representation of the physical environment includes a view of the physical environment through a transparent or semitransparent portion of the display generation component. In some embodiments, the representation 7014' of the physical object is locked (e.g., anchored) to the three-dimensional environment, such that as the user moves in the physical environment, the representation 7014' is maintained at its position within the three-dimensional environment (e.g., and is only displayed when the user's current view includes the portion of the three-dimensional environment at which the representation 7014' of the physical object is anchored).

Figure 7C:
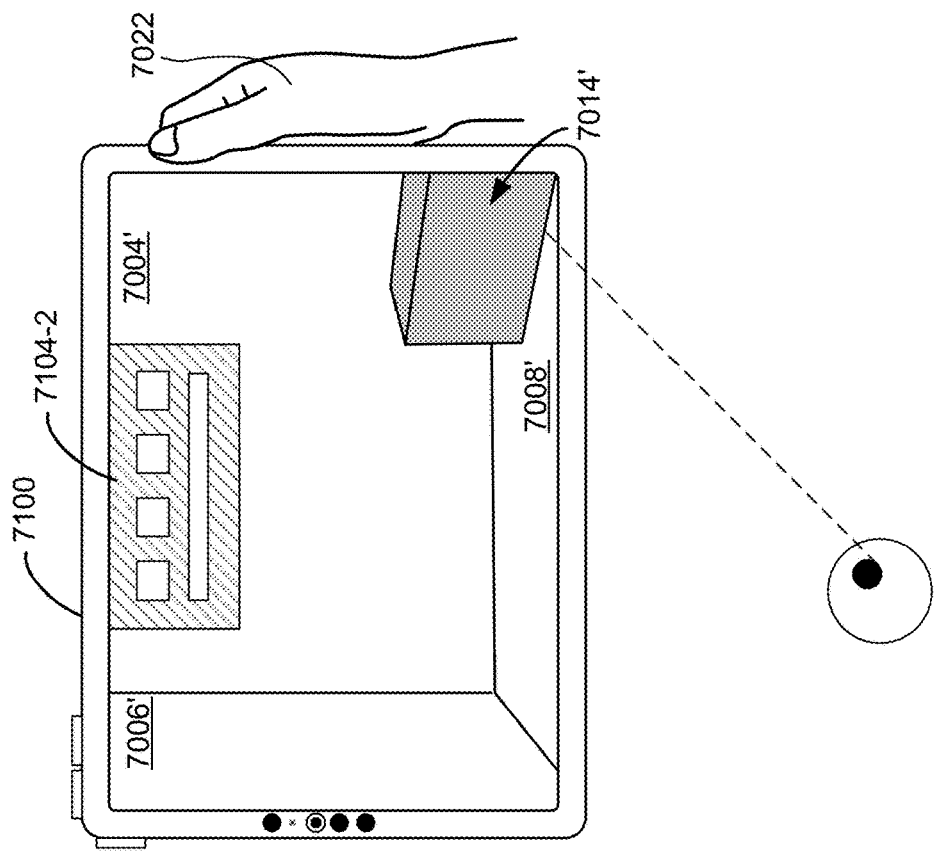
Figure 7D:
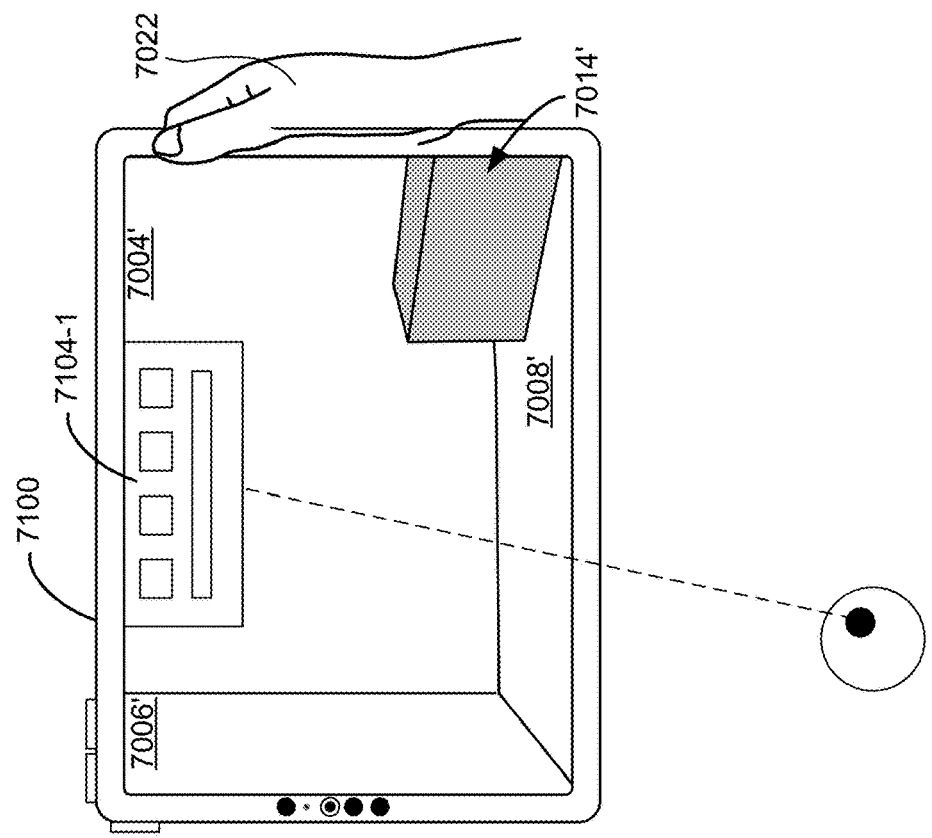
Figure 7F:
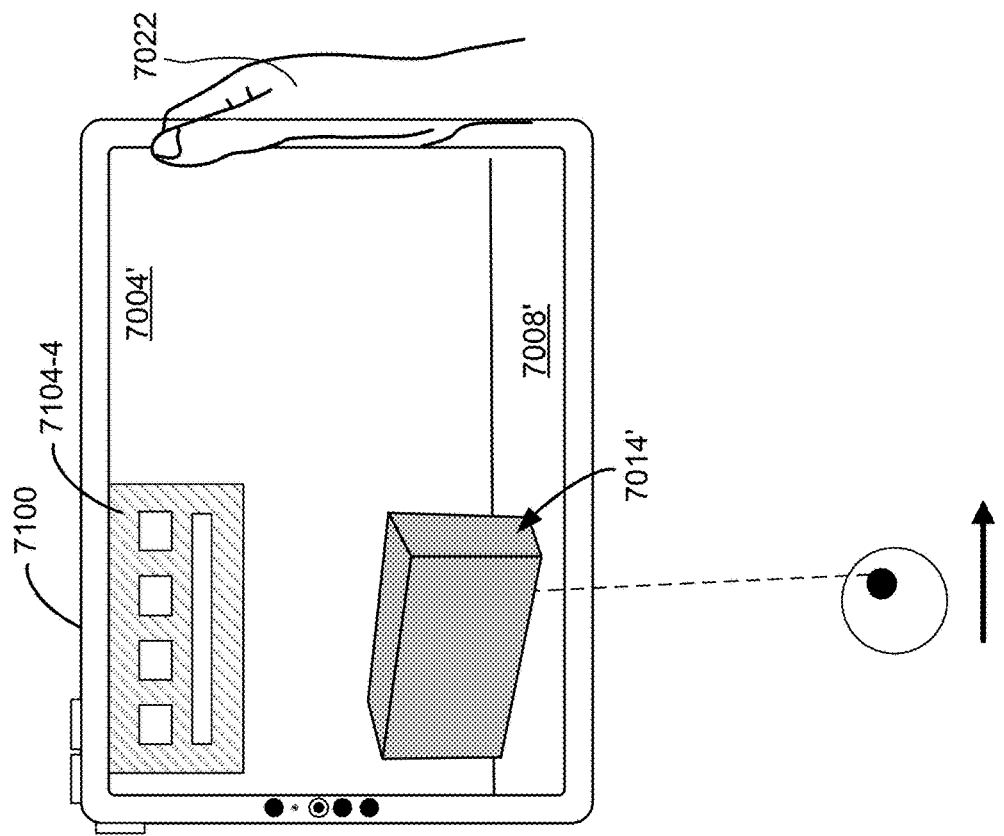
Figure 7E:
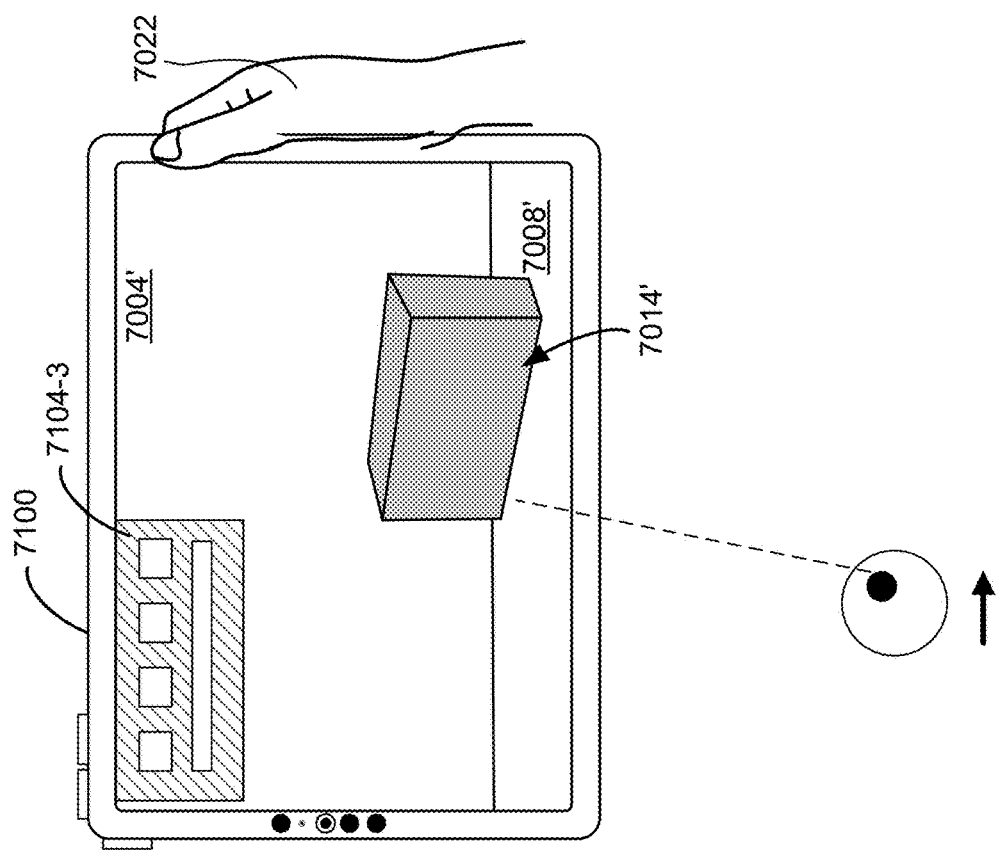

FIGS. 7C-7E illustrate examples of the user paying attention to various objects (e.g., physical objects in the physical environment and/or virtual objects) in the three-dimensional environment 7000' that is displayed using the display generation component 7100. For example, FIG. 7C illustrates a first view from the viewpoint of the user while the user is paying attention to (e.g., gazing at) user interface object 7104-1. For example, the user's attention is represented by the dashed line from the user's eye. In some embodiments, the computer system determines that the user is paying attention to respective portions (e.g., objects) of the three-dimensional environment based on sensor data that determines a gaze of the user and/or a head position of the user. It will be understood that the computer system is enabled to use a variety of sensor data to determine the portion of the three-dimensional environment at which the user is currently paying attention.

In some embodiments, the user interface object 7104-1 comprises a panel that includes a plurality of selectable user interface options (e.g., buttons) that are selectable, by the user, via the user's gaze and/or a gesture (e.g., an air gesture) with one or more of the user's hands. In some embodiments, the user controls (e.g., modifies) which selectable user interface options are included in the panel (e.g., user interface object 7104-1). For example, the user selects certain application icons, settings, controls, and/or other options to be displayed within the panel, such that the selected application icons, settings, controls, and/or other options that are included in the panel are easily accessible by the user (e.g., the user is enabled to interact with the panel even as the user moves in the physical environment because the panel follows the user as the user moves in the physical environment, as described in more detail below).

FIG. 7D illustrates the user paying attention to object 7014' (e.g., which is a representation of a physical object 7014 in the physical environment 7000). In response to the user not paying attention to the user interface object 7104-1 (e.g., as shown in FIG. 7C), the user interface object 7104-1 is updated to user interface object 7104-2, which is displayed as a visually deemphasized version of the user interface object 7104-1 (e.g., as indicated by the shaded fill). In some embodiments, the user interface object 7104-2 is displayed with faded visual properties, relative to the visual properties of user interface object 7104-1, which is displayed with the unmodified visual properties (e.g., not faded) while the user is paying attention to the user interface object 7104-1. In some embodiments, the user interface object 7104-2 is displayed with faded visual properties, relative to other objects (e.g., virtual objects and/or physical objects) that are displayed in the three-dimensional environment 7000'. For example, the representation 7014' of the physical object is not visually deemphasized (e.g., is unmodified) while the user interface object 7104-2 is visually deemphasized. In some embodiments, the user interface object is visually deemphasized by blurring the user interface object 7104-2, decreasing a size of the user interface object 7104-2, decreasing an opacity of the user interface object 7104-2, increasing a translucency of the user interface object 7104-2, ceasing display of the user interface object 7104-2 altogether, or a combination of visual effects (e.g., simultaneously fading and blurring) to deemphasize the user interface object 7104-2.

Figure 7H:
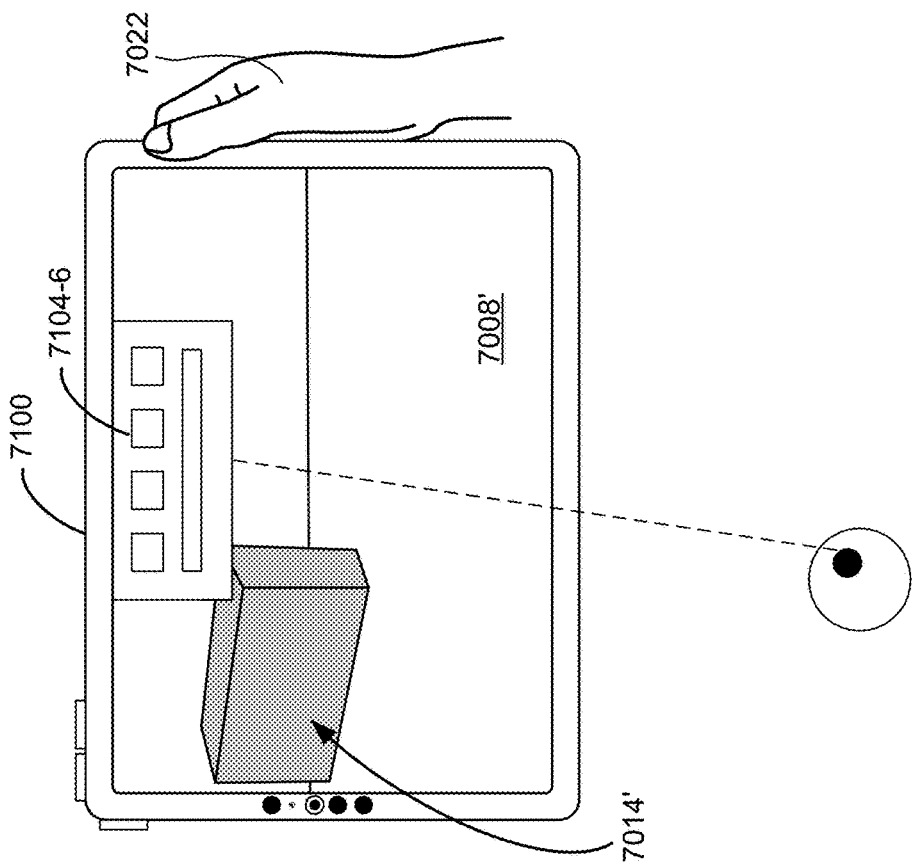
Figure 7G:
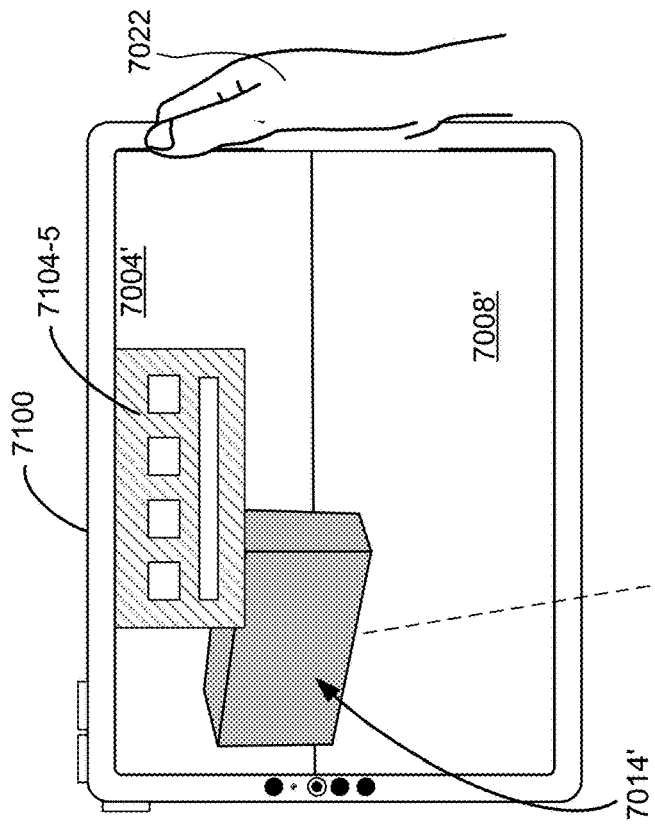

In some embodiments, as illustrated in FIGS. 7E-7G, while the user is not paying attention to the user interface object 7104 (e.g., user interface object 7104-3, user interface object 7104-4, and user interface object 7104-5), the user interface object 7104 continues to be displayed with the visual deemphasis (e.g., as indicated by the shaded fill in FIGS. 7E-7F). In some embodiments, while the user is not paying attention to the user interface object (e.g., as the amount of time in which the user has not paid attention to the user interface object increases), the visual deemphasis of the user interface object 7104 increases. For example, in response to the user initially turning the user's attention away from the user interface object 7104-1, the user interface object 7104-2 is displayed as faded by a first amount (e.g., the opacity of the user interface object is decreased by the first amount and/or the translucency of the user interface object is increased by the first amount). In some embodiments, after a predefined amount of time (e.g., 0.1, 0.2, 0.5, 1, 2, or 5 seconds), the user interface object 7104-3 (FIG. 7E) is displayed as faded by a second amount that is greater than the first amount (e.g., user interface object 7104-3 is displayed with a greater amount of visual deemphasis than user interface object 7104-2).

In some embodiments, an amount of visual deemphasis is determined based at least in part on a rate and/or amount (e.g., an amount of a change in angle and/or an amount of distance) of the user turning the user's attention away from the object. For example, in response to the user looking away from user interface object 7104-1 quickly (e.g., at a first rate), the user interface object 7104-2 is visually deemphasized by a first amount. In response to the user looking away (e.g., and/or turning away) from the user interface object 7104-1 less quickly (e.g., at a second rate slower than the first rate), the user interface object 7104-2 is deemphasized by a second amount that is smaller than the first amount. In some embodiments, the amount of visual deemphasis is based on an amount of change (e.g., a change in distance and/or a change in angle) between the user interface object 7104-1 and where the user's current attention is within the three-dimensional environment (e.g., in addition to, or instead of, based the rate of the user's movement/change in attention). For example, if the user shifts the user's attention to an area that is close (e.g., within 5 cm, or within 10 cm, or meets predefined proximity criteria) to the user interface object 7104-1, the user interface object is visually deemphasized by a smaller amount than if the user shifts the user's attention to an area that is farther (e.g., over 5 cm, or over 10 cm) away from the user interface object 7104-1. Thus, as the user shifts the user's attention away from the user interface object 7104-1, display of the user interface object 7104-2 is updated in accordance with one or more properties of the movement of the user and/or the change in the user's attention.

In some embodiments, as the user moves within the three-dimensional environment 7000' (e.g., corresponding to the user moving around the physical environment 7000), as illustrated in FIGS. 7E-7H, while the user continues to not pay attention to the user interface object 7104, the user interface object 7104 continues to be displayed with the visual deemphasis (or is not displayed). In some embodiments, the user interface object 7104 is displayed at various positions within the three-dimensional environment as the user moves in the physical environment (e.g., the user interface object 7104 follows the user), as described in more detail below.

In some embodiments, the user interface object 7104 continues to be displayed with the visual deemphasis until the computer system detects that the user is paying attention to the user interface object 7104, as illustrated in FIG. 7H. For example, in response to detecting that the user is paying attention to the user interface object 7104-6, the user interface object is displayed without visual deemphasis (e.g., the user interface object 7104-6 is displayed with the same visual properties as user interface object 7104-1 in FIG. 7C). In some embodiments, in response to detecting that the user is paying attention to the user interface object 7104-6, the user interface object 7104-6 is displayed at a position within the three-dimensional environment such that the user interface object 7104-6 has a same relative position to the user as the (e.g., a prior) relative position to the user of the user interface object 7104-1 (e.g., the initial position of the user interface object, relative to the user, before the user moved in the physical environment).

FIGS. 7E-7H are block diagrams illustrating the user interface object 7104 displayed at various positions within the three-dimensional environment as the user 7002 moves within the physical environment 7000. It will be understood that the change in position of the user interface object 7104 in the three-dimensional environment is enabled to be performed in conjunction with (e.g., concurrently with) the visual deemphasis of the user interface object 7104 described above.

In some embodiments, as illustrated in FIG. 7E, the user (e.g., and the user's current viewpoint) moves in the physical environment (e.g., the user moves to the right by a first amount of distance), and in response to the user moving in the physical environment, the view displayed on display generation component 7100 is updated (e.g., in real-time) to include a current view of the three-dimensional environment that reflects the user's movement in the physical environment. For example, as the user moves to the right in FIG. 7E (e.g., relative to the view in FIG. 7D), the representation 7014' of the physical object is displayed as more centered in the user's current view in FIG. 7E (compared to the representation 7014' of the physical object being displayed on the right edge of the user's view in FIG. 7D).

In some embodiments, while the user is moving in the physical environment, user interface object 7104-3 is initially maintained at a same position within the three-dimensional environment (e.g., relative to other displayed objects in the three-dimensional environment). For example, in FIG. 7D, the user interface object 7104-2 is displayed with its right edge aligned (e.g., vertically) with the left edge of representation of object 7014'. In response to the user moving by the first amount in FIG. 7E, the user interface object 7104-3 continues to be displayed at the same position within the three-dimensional environment relative to the representation of object 7014'. For example, the user interface object 7104-3 initially appears to be anchored to the three-dimensional environment. In some embodiments, the user interface object 7104-2 (e.g., and user interface object 7104-3) is maintained at a same position within the three-dimensional environment relative to other objects in the three-dimensional environment in accordance with the user moving less than a threshold amount (e.g., of distance, of a change in orientation and/or position) in the physical environment (e.g., the first amount of movement by the user is less than the threshold amount). In some embodiments, the user interface object 7104-2 (e.g., and user interface object 7104-3) is maintained at a same position within the three-dimensional environment relative to other objects in the three-dimensional environment for a first predefined time period of the user's movement. For example, the user interface object 7104-2 is displayed at a same position in the three-dimensional environment for the first 2 seconds (e.g., or 0.5 seconds, or 4 seconds) of the user moving in the physical environment.

In some embodiments, after the user has moved more than the threshold amount (e.g., by more than a threshold distance, by more than a threshold amount of change in orientation and/or position, and/or for a longer period of time than the first predefined time period), the user interface object 7104-4 is updated to be displayed at a position in the three-dimensional environment, different from its initial position (e.g., before the user began movement). For example, the user interface object 7104-3, without being updated, would disappear from the user's current view in FIG. 7F. Accordingly, the user interface object 7104-4 is moved, relative to other objects displayed in three-dimensional environment, to remain within the user's current view (e.g., the user interface object 7104-4 in its entirety, remains displayed as the user moves in the physical environment). As such, the user interface object 7104-4 is not anchored to the three-dimensional environment, and is instead anchored to a current viewpoint of the user.

In some embodiments, the display generation component 7100 displays the user interface object 7104-3 with animated movement (e.g., gradual and continual movement) into the position of user interface object 7104-4 shown in FIG. 7F. In some embodiments, while moving the user interface object 7104-3, the user interface object 7104-3 is visually deemphasized, as described above. In some embodiments, the user interface object 7104-3 through 7104-4 is displayed as if the user interface object is following the user (e.g., such that the user interface object 7104 remains displayed in its entirety in each respective current view of the user) as the user moves in the physical environment. In some embodiments, as the user interface object 7104-3 updates to the position of user interface object 7104-4, the rate of movement of the user interface object 7104-3 to the position of user interface object 7104-4 is displayed as a slower rate of movement than the rate of movement of the user in the physical environment. For example, the user interface object is delayed in following the user (e.g., only begins following the user after 2 seconds), and is displayed as moving more slowly within the three-dimensional environment than the rate of the movement of the user in the physical environment (e.g., and the rate of change to the user's current viewpoint). As such, the user interface object appears to lag behind the user as the user moves in the physical environment.

FIG. 7G illustrates the user continuing to move within the physical environment (e.g., relative to FIGS. 7D-7F). FIG. 7G illustrates additional lateral movement (e.g., side-to-side movement) of the user (e.g., and display generation component 7100) in the physical environment as the user continues moving to the right (e.g., in a same direction described above) in the physical environment. FIG. 7G further illustrates movement in the user's pose (e.g., orientation) in the vertical direction (e.g., as illustrated by the downward arrow in FIG. 7G). For example, the user moves to the right in the physical environment while also moving (e.g., concurrently) the user's current viewpoint downward (e.g., to include more of the representation of the floor 7008' in FIG. 7G). In some embodiments, the user interface object 7104-5 is updated (e.g., at a slower rate than the user) to move as the user moves in the physical environment. For example, the user moves more to the right in FIG. 7G, relative to FIG. 7E, and the user interface object 7104 is also displayed as moving to the right (e.g., with the user) between FIGS. 7E-7G at a rate that is slower than the rate of movement of the user. For example, instead of user interface object 7104 continuing to be displayed at the top-center portion of the user's current viewpoint in FIGS. 7E-7G (e.g., which would indicate the user interface object 7104 moving at a same rate as the user), the user interface object 7104 appears to lag in movement while the user is moving.

In some embodiments, after the user has moved by more than a threshold amount of movement (e.g., and the user interface object 7104 has moved from its initial position to an updated position to remain within the user's current view), the user interface object 7104 continues to follow the user in the three-dimensional environment as the user continues to move in the physical environment. In some embodiments, the user interface object 7104 is moved to different positions within the three-dimensional environment (e.g., as the user moves in the physical environment) in order to maintain a same spatial relationship relative to the user (e.g., relative to a portion of the user's body and/or relative to the user's current viewpoint). For example, the user interface object 7104 continues to follow the user to remain within a predefined portion of the user's current view (e.g., in the top left corner of the user's current view) and/or at a predefined distance away from the user's current view (e.g., within an arm's length away from the user).

The user's viewpoint is optionally updated by any combination of moving the display generation component 7100 laterally within the physical environment, changing a relative angle (e.g., pose) of the display generation component 7100, and/or changing a pose (e.g., orientation) of the user's head (e.g., as the user looks down toward the floor 7008, such as when the display generation component is an HMD worn by the user). The examples described herein of the user's movement in the physical environment in a particular direction and/or orientation (e.g., rightward and/or downward) are non-limiting examples of the user's movement within the physical environment. For example, other movements (e.g., to the leftward, upward, and/or a combination of different directions and/or poses) of the user cause the user interface object to be displayed with similar behavior (e.g., wherein the user interface object moves within the user's current viewpoint of the three-dimensional environment to follow the user's movement (optionally, with a delay and/or lag)).

In some embodiments, as illustrated in FIG. 7H, after the user has moved more than a threshold amount (e.g., of distance, in pose and/or orientation) in the physical environment, the user interface object 7104-6 is redisplayed at a position within the user's current view of the three-dimensional environment that is defined relative to the user (e.g., the user's body and/or the user's viewpoint). For example, in FIG. 7C, the user interface object 7104-1 is initially displayed at a position within the three dimensional environment that is defined relative to the user's current viewpoint. For example, the user interface object 7104-1 is displayed at a predefined distance (e.g., in perceived depth) from the user and at a height relative to the user (e.g., at the top of the user's current viewpoint, or at a predefined angle (e.g., 45 degrees) above the user's viewpoint when the user is looking straight ahead). In some embodiments, while the user is moving within the physical environment, before the user has moved by a threshold amount, the user interface object is moved within the user's current view to appear with lazy follow behavior described with reference to FIGS. 7E-7G, and after the user has moved by at least the threshold amount (e.g., as illustrated in FIG. 7H), the user interface object 7104-6 is redisplayed with the same position defined relative to the user's current viewpoint described in FIG. 7C. In some embodiments, the same position defined relative to the user's current viewpoint corresponds to a predefined zone that is within a comfortable viewing distance of the user.

In some embodiments, the delayed and lagging behavior (e.g., also referred to herein as lazy follow behavior) of the user interface object 7104, described above, is performed in accordance with the user interface object 7104 being added to one of a plurality of predefined zones. For example, the initial position of the user interface object 7104-1 is set within a first zone of the plurality of predefined zones, where user interface objects that are placed within (e.g., anchored to) one of the plurality of predefined zones are updated in accordance with the lazy follow behavior described herein. In some embodiments, the user 7002 is enabled to move user interface objects into various zones and also to move those objects out of the zones (e.g., such that the lazy follow behavior no longer applies while a respective user interface object is not placed within one of the predefined zones). In some embodiments, while the user selects a user interface object, the plurality of predefined zones are highlighted (e.g., with an outline for each respective zone) to indicate to the user where the user is enabled to place the user interface object to cause the user interface object to have the lazy follow behavior.

In some embodiments, a predefined zone covers a predefined portion (e.g., in a predefined shape) of the three-dimensional environment. For example, the predefined zone occupies a position in the three-dimensional environment that is defined by its length, width, depth, and/or shape (e.g., boundaries). For example, a first predefined zone is positioned at (e.g., occupies) a first depth (e.g., or range of depths), and has a first width, length, and/or height. In some embodiments, the first predefined zone occupies a portion of the three-dimensional environment that corresponds to a three-dimensional shape, or optionally a two-dimensional shape (e.g., a two-dimensional window or dock). For example, the first predefined zone is a cube at a predefined position in the three-dimensional environment (e.g., and moving the user interface object into the cube at the predefined position is moving the user interface object into the first predefined zone).

In some embodiments, the user interface object 7104 disappears while the user moves the user's head, without moving the user's body in the physical environment. In some embodiments, the user interface object continues to be displayed (e.g., with the visually deemphasized properties) while the user moves the user's body (e.g., torso and head). For example, if the user turns the user's head (e.g., which updates the user's current view of the three-dimensional environment), without the user changing the user's location (e.g., moving from a first location to a second location in the physical environment) and/or without the user moving the user's torso (e.g., to change an orientation of the user's body), the user interface object 7104 is not animated as moving from a first position to a second position in the three-dimensional environment. Instead, the user interface object 7104 is not displayed during the movement of the user, and is redisplayed (e.g., when the user is stationary for a predefined time period at the second position) in response to the user's head movement stopping (e.g., and remaining at the new position of the user's head for the predefined time period).

Figure 7J:
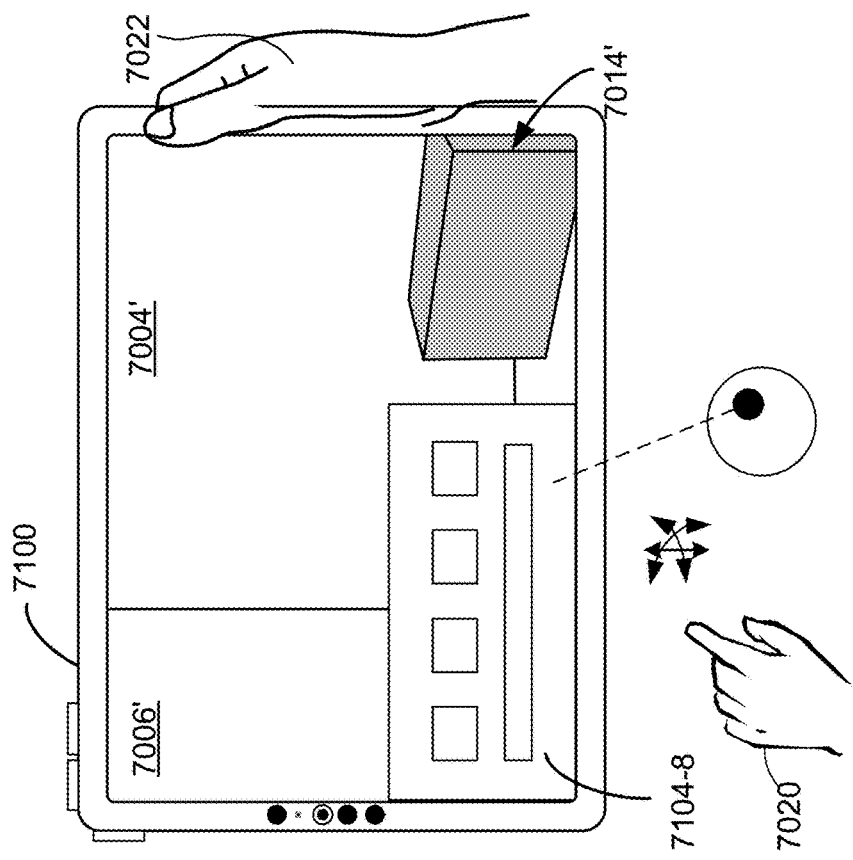
Figure 7I:
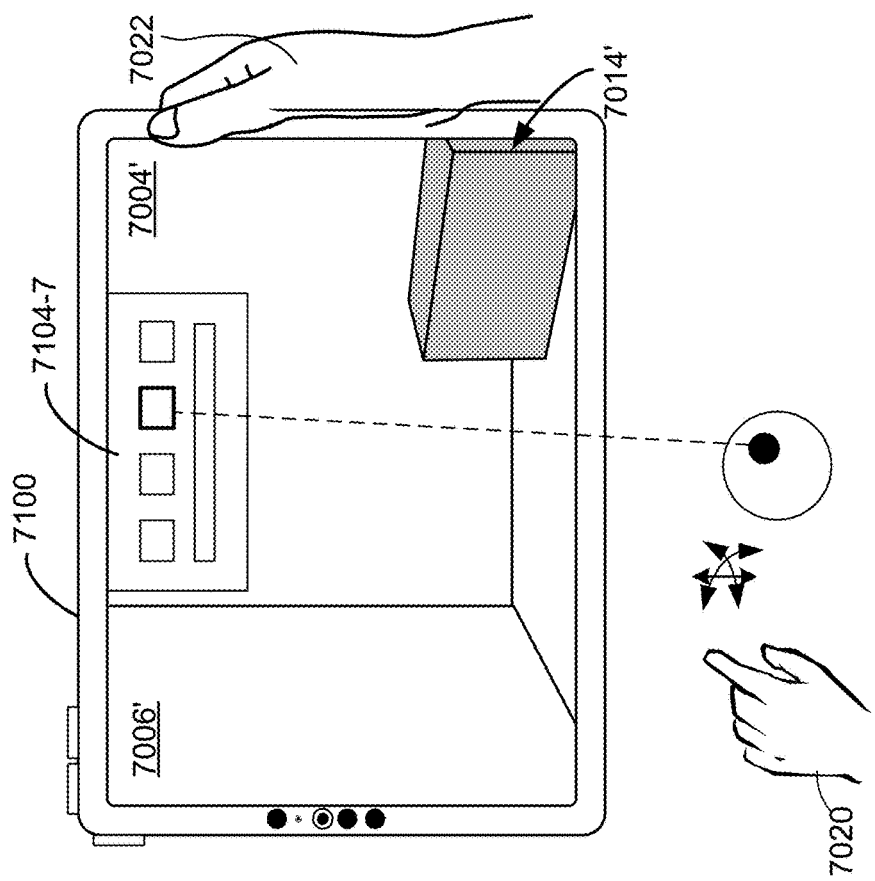

In some embodiments, the user is further enabled to interact with the user interface object 7104-4, as illustrated in FIG. 7I. For example, the user interface object 7104-7 is a panel that includes a plurality of selectable objects (e.g., application icons, controls in a control center, settings, and/or buttons). In response to detecting a user input (e.g., the user's gaze and/or an air gesture) directed to a first selectable object of the plurality of selectable objects, in some embodiments, the first selectable object is emphasized (e.g., highlighted, outlined, enlarged, or otherwise distinguished relative to the other selectable objects).

In some embodiments, the plurality of selectable objects includes one or more controls for an immersive experience in the three-dimensional environment. For example, the user interface object 7104-7 includes a play and/or a pause control for immersing the user in the three-dimensional environment into a fully virtual experience, and provides the user with options to change the level of immersion (e.g., to display more or less passthrough content from the physical environment in the three-dimensional environment). For example, a control for playing and/or pausing an immersive experience in the three-dimensional environment is displayed. In some embodiments, a greater level of immersion in the three-dimensional environment includes additional virtual features, such as display of virtual objects, display of virtual wallpaper, display of virtual lighting, etc. Accordingly, the user is enabled to control how much of the physical environment is displayed in the three-dimensional environment as passthrough content versus an amount of virtual content that is displayed in the three-dimensional environment.

For example, as illustrated in FIG. 7J, in response to a user input (e.g., a hand gesture using the user's hand 7020, or a combined hand and gaze gesture), the user is enabled to move the user interface object to a different position within the three-dimensional environment relative to the user's current view (e.g., the user interface object 7104-8 is displayed in the lower left of the user's current view in FIG. 7J). In some embodiments, the new position of the user interface object 7104-8 is within a predefined zone of the plurality of predefined zones (e.g., and the user interface object 7104-8 will continue to have the lazy follow behavior as the user moves in the physical environment). For example, the user repositions the user interface object 7104-8 from a first predefined zone to a second predefined zone. In some embodiments, after the user interface object is moved to the second predefined zone, after the user moves (e.g., by more than a threshold amount of movement) in the physical environment, the user interface object is moved in the three-dimensional environment to remain displayed in the user's current view at the position relative to the user of the second predefined zone.

In some embodiments, in response to the user positioning the user interface object near (e.g., within a threshold distance of) a predefined zone (e.g., while the zone is highlighted as the user selects and moves the user interface object around in the three-dimensional environment), the user interface object 7104 snaps to the predefined zone (e.g., in accordance with the user confirming to place the user interface object in the predefined zone). For example, in response to the user repositioning the user interface object close enough to the predefined zone, the computer system automatically displays the user interface object snapped to the predefined zone (e.g., and the user releases the pinch and/or drag gesture to plop (e.g., and snap) the user interface object into place without requiring the user to fully align the user interface object with the predefined zone). In some embodiments, in accordance with the user interface object snapping into place in the predefined zone, the computer system outputs an audio and/or haptic indication.

In some embodiments or in some circumstances, the new position of the user interface object 7104-8 is not within a predefined zone of the plurality of predefined zones. In some embodiments, if the user interface object 7104 is not placed within a predefined zone (e.g., the user repositions the user interface object to a position in the three-dimensional environment that does not correspond to a predefined zone), the user interface object 7104-8 does not continue to have the lazy follow behavior as the user moves in the physical environment (e.g., the user interface object 7104-8 is anchored to the three-dimensional environment to be world-locked instead of changing positions to remain within the current view of the user as the user moves).

In some embodiments, the user is only enabled to reposition the user interface object within a predefined distance from the user. For example, the user interface object is placed at a position within an arm's reach of the user. In some embodiments, the user interface object cannot be placed at a position outside of the predefined distance from the user (e.g., more than an arm's distance from the user). For example, in response to the user repositioning the user interface object to a position in the three-dimensional environment that is farther from the user than the predefined distance from the user, the computer system provides an error warning to the user (e.g., and does not allow the user to place the user interface object at the position that is farther than the predefined distance away from the user). In some embodiments, in response to the user repositioning the user interface object to a position in the three-dimensional environment that is farther from the user than the predefined distance from the user, the computer system allows the user to place the object at the position, but provides a warning (e.g., a textual indication) that the user interface object, when placed at the position, will not follow the user in the three-dimensional environment (e.g., that placing the object at the position that is farther than the predefined distance from the user anchors the object to the three-dimensional environment such that the user interface object does not move to maintain a same relative spatial relationship with the user as the user moves in the physical environment).

In some embodiments, as illustrated in FIG. 7J, the user is also enabled to resize the user interface object 7104-8. For example, a user input (e.g., a pinch gesture with a first hand) is directed to the user interface object 7104-8 (e.g., on a resizing affordance of the user interface object 7104-8), and the user interface object 7104-8 is enlarged and/or reduced in size in accordance with the user dragging the resizing affordance outward from the user interface object (e.g., to enlarge the user interface object) or dragging the resizing affordance inward toward the center of the user interface object (e.g., to decrease the size of the user interface object). In some embodiments, the user is enabled to perform a two-handed gesture (e.g., using both hands to perform a gesture). For example, after selecting the user interface object (e.g., with a pinch gesture) with the user's first hand, the user can move the user's other hand closer and/or farther away from the user's first hand (e.g., pinching the user interface object) to decrease and/or increase the size of the user interface object, respectively. In some embodiments, input gestures used in the various examples and embodiments described herein (e.g., with respect to FIGS. 7A-7J, and FIGS. 8-9) optionally include discrete, small motion gestures performed by movement of the user's finger(s) relative to other finger(s) or part(s) of the user's hand, optionally, without requiring major movement of the user's whole hand or arm away from their natural location(s) and posture(s) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, and/or depth cameras). For example, the one or more imaging sensors are components of or provide data to a computer system (e.g., computer system 101 in FIG. 1 (e.g., a portable electronic device, or an HMD)) that includes a display generation component (e.g., display generation component 120 or 7100 in FIGS. 1, 3, and 4 (e.g., a touch-screen display that serves as a display and a touch-sensitive surface, a stereoscopic display, and/or a display with a pass-through portion). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7102), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, and/or a swipe input type). In some embodiments, the amount of movement performed by the moving finger (e.g., thumb) and or other movement metrics associated with the movement of the finger (e.g., speed, initial speed, ending speed, duration, direction, and/or movement pattern) is used to quantitatively affect the operation that is triggered by the finger input.

In some embodiments, the computer-system recognizes combination input types that combines a sequence of movements by the thumb, such as a tap-swipe input (e.g., touchdown of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7J are provided below in references to methods 800 and 900 described with respect to FIGS. 8-9 below.

Figure 8:
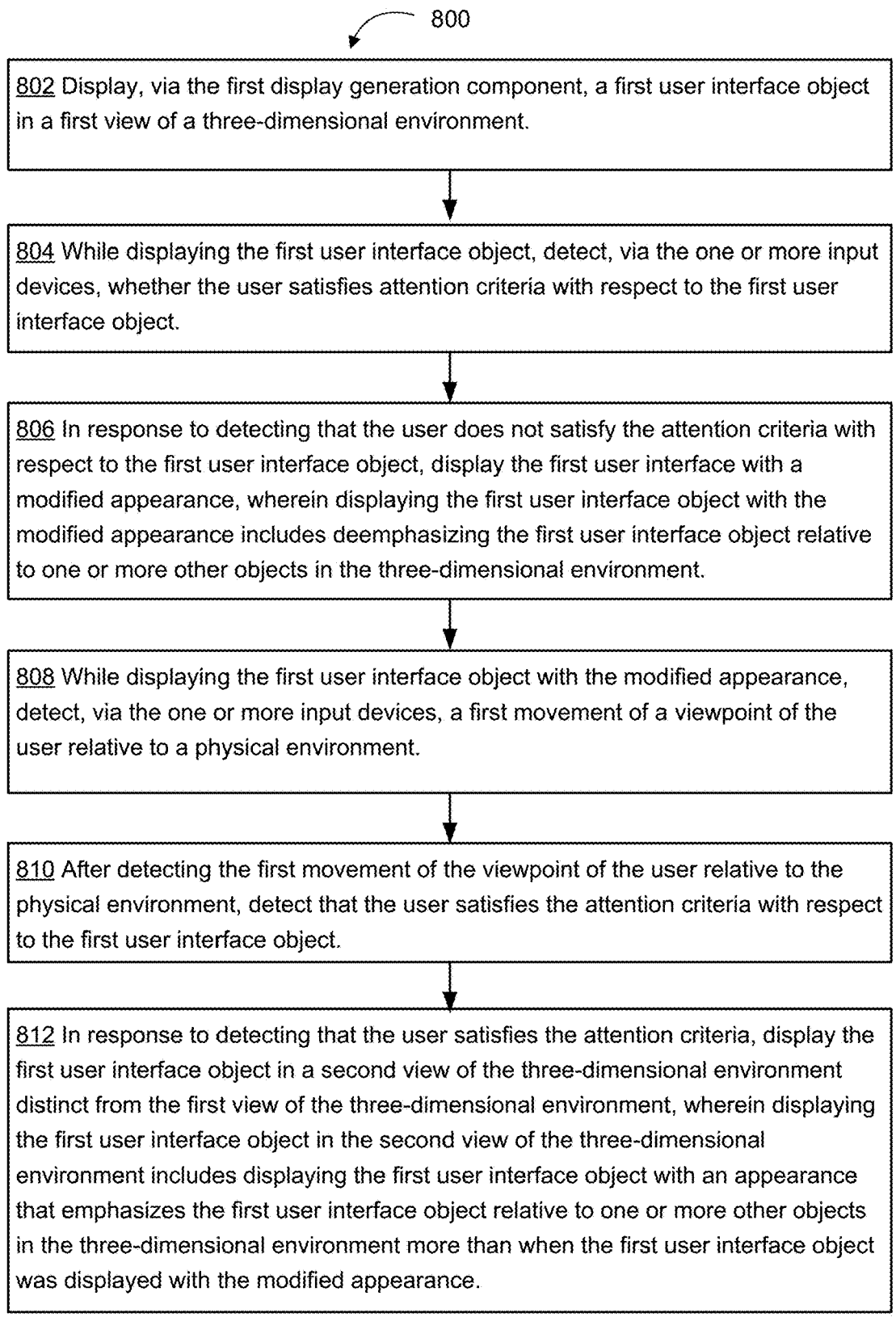
FIG. 8 is a flowchart of a method of visually deemphasizing a user interface element in a three-dimensional environment while the user is not paying attention to the user interface element, in accordance with some embodiments.

FIG. 8 is a flowchart of a method 800 of visually deemphasizing a user interface element in a three-dimensional environment while the user is not paying attention to the user interface element, in accordance with some embodiments.

In some embodiments, the method 800 is performed at a computer system (e.g., computer system 101 in FIG. 1) including a first display generation component (e.g., display generation component 120 in FIGS. 1, 3, and 4) (e.g., a heads-up display, a display, a touchscreen, and/or a projector) and, one or more input devices, such as one or more sensors (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, the computer system is in communication with the first display generation component (e.g., the first display generation component is a heads-up display, a head-mounted display (HMD), a display, a touchscreen, and/or a projector) and one or more input devices (e.g., cameras, controllers, touch-sensitive surfaces, joysticks, buttons, gloves, watches, motion sensors, and/or orientation sensors). In some embodiments, the first display generation component is a first display generation component 7100 described with respect to FIGS. 7A-7J. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, and/or a laptop computer) that includes one or more processors and memory that is separate from the first display generation component and/or the one or more input devices. In some embodiments, the first display generation component and the one or more input devices are integrated and enclosed in the same housing. Many of the features of the method 800 are described with respect to FIGS. 7A-7J, in accordance with some embodiments.

The method 800 relates to displaying a user interface element that is visually deemphasized when the user is not paying attention to the user interface element. The user interface element remains deemphasized as the user moves around in the physical environment, and when the user pays attention to the user interface element, the user interface element is no longer deemphasized and is displayed for the user at a position within the three-dimensional environment based on the user's current view of the three-dimensional environment. Automatically deemphasizing and changing a displayed location of user interface objects based on whether the user is paying attention to the user interface object and based on the user's current viewpoint, provides real-time visual feedback as the user shifts their attention to different portions of the three-dimensional environment. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

The computer system displays (802), via the first display generation component, a first user interface object in a first view of a three-dimensional environment. In some embodiments, the first user interface object includes one or more user interface objects in a predetermined layout (e.g., the user interface object 7104-1 includes one or more user interface objects displayed within user interface object 7104-1).

While displaying the first user interface object, the computer system detects (804), via the one or more input devices, whether the user satisfies attention criteria with respect to the first user interface object (e.g., whether the user is paying attention to the first user interface object, such as by determining whether the user satisfies a gaze detection criteria and/or a head position criteria). For example, as described above with reference to FIGS. 7C and 7D, in some embodiments, the computer system detects whether the user is paying attention to the user interface object 7104-1 (e.g., as indicated by the dashed line from the user's eye to the user interface object 7104-1), or whether the user is not paying attention to the user interface object 7104-2 (e.g., as indicated by the dashed line from the user's eye to representation 7014' of a physical object).

In response to detecting that the user does not satisfy the attention criteria with respect to the first user interface object (e.g., the user is not paying attention to the first user interface object), the computer system displays (806) the first user interface with a modified appearance, wherein displaying the first user interface object with the modified appearance includes deemphasizing the first user interface object relative to one or more other objects (e.g., real objects or virtual objects) in the three-dimensional environment. For example, as described above with reference to FIG. 7D, the computer system visually deemphasizes (e.g., reduces opacity and/or increases a blur of) the first user interface object 7104-2 while the user is not paying attention to the first user interface object.

While displaying the first user interface object with the modified appearance, the computer system detects (808), via the one or more input devices, a first movement of a viewpoint of the user relative to a physical environment. For example, as described with reference to FIGS. 7D-7H, the user moves the user's location in the physical environment. In some embodiments, the user's location (and current viewpoint) optionally includes both a position of the user (e.g., in three-dimensional space) in the physical environment and the user's pose/orientation within the physical environment. In some embodiments, the physical environment corresponds to the three-dimensional environment (e.g., at least a portion of the physical environment is displayed as pass-through content), such that a change in the user's orientation and/or position in the physical environment updates the user's current view of the three-dimensional environment. In some embodiments, the first movement must satisfy movement criteria (e.g., the user must move at least a threshold amount from a previous position in the physical environment, and/or the user must move the user's torso (e.g., not just the user's head) in the physical environment) before the computer system determines (e.g., or makes a new determination) whether the user satisfies the attention criteria. Optionally, a change in the user's pose and/or orientation in the physical environment can satisfy the movement criteria.

After detecting the first movement of the viewpoint of the user relative to the physical environment (e.g., in accordance with or in response to detecting the first movement of the viewpoint), the computer system detects (810) that the user satisfies the attention criteria with respect to the first user interface object (e.g., the user is paying attention to the first user interface object), as described with reference to FIG. 7H.

In response to detecting that the user satisfies the attention criteria, the computer system displays (812) the first user interface object in a second view of the three-dimensional environment distinct from the first view of the three-dimensional environment, wherein displaying the first user interface object in the second view of the three-dimensional environment includes displaying the first user interface object with an appearance that emphasizes the first user interface object relative to one or more other objects (e.g., real or virtual objects) in the three-dimensional environment more than when the first user interface object was displayed with the modified appearance. For example, as described with reference to FIG. 7H, the first user interface object is displayed at a different position in the three-dimensional environment (e.g., as compared to its position in the three-dimensional environment in FIG. 7D), but continues to have the first spatial relationship to the first anchor position that corresponds to a current viewpoint (e.g., location and/or position) of the user in the physical environment. Further, as illustrated in FIG. 7H, the user interface object 7104-6 is no longer visually deemphasized (as it is while the user is not paying attention to the user interface object) in response to the user looking at the user interface object 7104-6. As such, in some embodiments, the first user interface object is displayed as following the user as the user moves in the physical environment.

In some embodiments, the first user interface object has a first spatial relationship to a first anchor position in the three-dimensional environment that corresponds to a location of the user (e.g., the body of the user) in the physical environment. For example, the first user interface object is maintained in a same general location relative (e.g., or locked) to the user's torso, hand, head, or other portion of the user's body. In some embodiments, the first spatial relationship is maintained before and after the movement of the viewpoint of the user. For example, as described with reference to FIGS. 7C and 7H, the first spatial relationship between the user's viewpoint and the instances of the user interface object 7104-1 and 7104-6 is maintained before and after the user has moved in the physical environment. Automatically displaying certain user interface objects at a position that is maintained in a same general location (e.g., or locked) with respect to a portion of the user's body, even as a user's perspective changes (e.g., by changing the user's current viewpoint as the user moves around the physical environment), provides real-time visual feedback as the user moves around the physical environment, thereby providing improved visual feedback to the user.

In some embodiments, after detecting the first movement of the viewpoint of the user relative to the physical environment, the computer system maintains display of the first user interface object at a same anchor position in the three-dimensional environment (e.g., until a time threshold is satisfied). In some embodiments, the first user interface object initially is maintained at a same location within the three-dimensional environment while the viewpoint of the user moves. In some embodiments, as the viewpoint of the user moves more than a threshold distance and/or as the viewpoint of the user is moved for a threshold amount of time (e.g., the user moves and stops, but does not return to the initial viewpoint), the user interface object moves in the three-dimensional environment, as described with reference to FIGS. 7E-7H. In some embodiments, the rate of movement of the user interface object is slower than the rate of movement of the viewpoint of the user. Automatically displaying certain user interface objects at a position that maintained in a same general location (e.g., or locked) with respect to the three-dimensional environment, even as the user's perspective changes (e.g., by changing the user's current viewpoint as the user moves around the physical environment), provides real-time visual feedback as the user moves around the physical environment, thereby providing improved visual feedback to the user.

In some embodiments, after detecting the first movement of the viewpoint of the user relative to the physical environment, in accordance with a determination that the first movement satisfies a time threshold (e.g., the user moves for at least the time threshold, or the user has moved and stayed in the second viewpoint for the time threshold), the computer system moves the first user interface object in the three-dimensional environment to a same position relative to the viewpoint of the user (e.g., a same position as before the movement of the viewpoint of the user), as described above with reference to FIG. 7H. Automatically displaying certain user interface objects as moving within the three-dimensional environment after the user has moved around the physical environment for longer than a predefined amount of time (e.g., and/or has remained in a different position within the three-dimensional environment for the predefined amount of time), provides real-time visual feedback as the user moves around the physical environment, thereby providing improved visual feedback to the user.

In some embodiments, the computer system receives a user input to reposition (e.g., anchor) the first user interface object in the three-dimensional environment. In some embodiments, in response to receiving the input to reposition the first user interface object in the three-dimensional environment, the computer system repositions the first user interface object to a respective position in the three-dimensional environment in accordance with the input, for example, as described above with reference to FIG. 7J. In some embodiments, after repositioning the first user interface object to the respective position in the three-dimensional environment in accordance with the input, the computer system detects an input to change a viewpoint of the user, and in response to detecting the input to change the viewpoint of the user, the computer system changes the viewpoint of the user in accordance with the input to change the viewpoint of the user and displaying the first user interface object in the three-dimensional environment from the current viewpoint of the user, including: in accordance with a determination that the first user interface object is positioned within a first predefined zone, displaying the first user interface object at a respective position that has a first spatial relationship to a first anchor position in the three-dimensional environment that corresponds to a location of the viewpoint of the user in the physical environment (e.g., and displaying the first user interface object at the respective position after detecting the movement of the viewpoint of the user relative to the physical environment, while the first user interface object is positioned within the first predefined zone), and in accordance with a determination that the first user interface object is not positioned within the first predefined zone (e.g., or any predefined zone of a plurality of predefined zones), maintaining display of the first user interface object at a same anchor position in the three-dimensional environment that does not correspond to a location of the body of the user in the physical environment. For example, as described above with reference to FIGS. 7C-7H, the first predefined zone is a zone that follows the viewpoint of the user as the user moves in the physical environment. In some embodiments, the first predefined zone follows the viewpoint of the user with a delay (e.g., the first predefined zone moves at a slower rate than the rate of movement of the user). For example, the first predefined zone initially does not move with the viewpoint of the user until the viewpoint of the user has moved by a threshold amount (e.g., by at least the threshold amount) and/or the viewpoint of the user has moved for a threshold amount of time (e.g., for at least the threshold amount of time). In some embodiments, the first predefined zone is referred to herein as a lazy follow zone. Allowing a user to anchor certain user interface objects to a zone, where user interface objects placed within the zone automatically follow the user in the three-dimensional environment, even as the user moves around the physical environment, and differentiating the user interface objects placed in the zone from user interface objects placed outside of the zone, which are instead anchored to the three-dimensional environment such that they do not automatically follow the user in the three-dimensional environment, provides real-time visual feedback as the user moves in the physical environment, thereby providing improved visual feedback to the user.

In some embodiments, the first predefined zone is selected from a plurality of predefined zones in the three-dimensional environment, wherein the first predefined zone has a first spatial relationship relative to a first anchor position in the three-dimensional environment that corresponds to a location of the viewpoint of the user, and a second predefined zone of the plurality of predefined zones has a second spatial relationship (e.g., distinct from the first spatial relationship of the first predefined zone) relative to a second anchor position in the three-dimensional environment that corresponds to a location of the viewpoint of the user. For example, as described with reference to FIG. 7J, the user is enabled to reposition the user interface element into any of a plurality of predefined zones, where each predefined zone has a different relative spatial arrangement to the user's current viewpoint. In some embodiments, user interface objects placed within the predefined zones follow movement of the viewpoint of the user (e.g., with lazy follow behavior). In some embodiments, the first predefined zone is displayed at a first position in the user's current view of the three-dimensional environment relative to the user, wherein the first position is maintained before and after the movement of the user, and the second predefined zone is displayed at a second position in the user's current view of the three-dimensional environment relative to the user, wherein the second position is maintained before and after the movement of the user. Providing the user with options to change an anchor of certain user interface objects to be placed within any of a plurality of zones within the three-dimensional environment, each zone having a different relative position to the user's current view, makes it easy for the user to place certain user interface objects in a position that is most comfortable or convenient for the user to view and provides real-time visual feedback as the user selects where to place user interface objects and as the user moves in the physical environment, thereby providing improved visual feedback to the user.

In some embodiments, in response to detecting the user initiating the user input to reposition the first user interface object, the computer system displays a visual indication for the first predefined zone, and while detecting the user input to reposition the first user interface object to the first predefined zone, maintains display of the visual indication for the first predefined zone. In some embodiments, the computer system, optionally, in response to no longer detecting the user input to reposition the first user interface object (e.g., in response to the end of the user input), ceases to display the visual indication for the first predefined zone. In some embodiments, the computer system displays visual indications for each of the predefined zones of the plurality of predefined zones. In some embodiments, the computer system provides outlines of the lazy follow zone(s) so that the user knows where they can place (e.g., drag and drop, or plop) the first user interface object such that the first user interface object will have the lazy follow behavior (e.g., wherein, while the first user interface object is in a lazy follow zone, the first user interface object follows the viewpoint of the user (e.g., with a delay)). For example, as described with reference to FIG. 7J, the computer system optionally provides an outline of the predefined zones.

Automatically displaying outlines of a plurality of zones within the three-dimensional environment, each zone having a different relative position to the user's current view, makes it easy for the user to select a zone in which to anchor certain user interface objects, so that the user interface objects will follow the user as the user moves in the physical environment when the user interface objects are placed within a zone, and allows the user to more easily determine where to position a user interface object within the three-dimensional environment that is most comfortable or convenient for the user to view, thereby providing improved visual feedback to the user.

In some embodiments, the attention criteria with respect to the first user interface object includes a gaze criterion. For example, the computer system uses one or more cameras and/or other sensors to determine whether the user is gazing at (e.g., looking at and/or paying attention to) the first user interface object, as described above with reference to FIG. 7C. Automatically determining whether the user is paying attention to a certain user interface object by detecting whether the user is gazing at the user interface object, and updating the display of the user interface object automatically when the user is gazing at the user interface object, without requiring additional input from the user, provides additional controls for the user without requiring the user to navigate through complex menu hierarchies, thereby providing improved visual feedback to the user without requiring additional user input.

In some embodiments, the attention criteria with respect to the first user interface object includes a criterion for a position of the head of the user in the physical environment. For example, as the user's head moves (e.g., in pose, orientation, and/or position) within the physical environment, the computer system determines if the user's head is in a particular pose, orientation and/or position relative to the first user interface object, as described above with reference to FIG. 7C. Automatically determining whether the user is paying attention to a certain user interface object by detecting whether the user's head is at a particular position, such as turned toward the user interface object, and updating the display of the user interface object automatically when the user's head is at the particular position, without requiring additional input from the user, provides additional controls for the user without requiring the user to navigate through complex menu hierarchies, thereby providing improved visual feedback to the user without requiring additional user input.

In some embodiments, the computer system detects (e.g., receives) a pinch input (e.g., a pinch input that includes movement of two or more fingers of a hand to make contact with one another, or to break contact from each other) directed to a first affordance displayed on at least a portion of the first user interface object followed by movement of a hand that performed the pinch input, and in response to the movement of the hand, changes a size of the first user interface object in accordance with the movement of the hand. For example, the user is able to resize the first user interface object, as described with reference to FIG. 7J. In some embodiments, the movement of the hand that performed the pinch input is a drag gesture (e.g., the pinch and drag gesture is performed with one hand). For example, a pinch gesture that includes movement of two or more fingers of a hand to make contact with one another, or to break contact from each other, in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). For example, the pinch input selects the first affordance, and the user is enabled to, once selected, drag the affordance away from a center portion of the first user interface object (e.g., to increase the size of the first user interface object), and/or drag the affordance toward the center portion of the first user interface object (e.g., to decrease the size of the first user interface object). In some embodiments, the first affordance is displayed on a corner of the first user interface object (e.g., the first affordance is a resizing affordance). In some embodiments, the user pinches the first affordance (e.g., to select the affordance) and, with the same hand that is pinching the first affordance, drags the corner of the first user interface object from a first position to a second position in the three-dimensional environment. For example, the user drags the affordance outward to enlarge the first user interface object, or drags the corner of the first user interface object inward to decrease the size of the first user interface object. In some embodiments, the movement of the hand comprises the user changing a distance between two or more fingers that are performing the pinch input. For example, the user brings the user's thumb and pointer finger closer together to cause the user interface object to decrease in size, and the user opens the pinch gesture (e.g., increasing a distance between two fingers (e.g., the user's thumb and pointer finger)) to cause the user interface object to increase in size. In another example, movement of the user's entire hand causes the user interface object to increase or decrease in size, depending on the direction of movement of the user's hand. In some embodiments, the pinch input is directed to a first affordance directly (e.g., the user performs the pinch input at a position that corresponds to the first affordance), or the pinch input is directed to the first affordance indirectly (e.g., the user performs the pinch input while gazing at the first affordance, wherein a position of the user's hand while performing the pinch input is not at the position that corresponds to the first affordance). For example, the user is enabled to direct the user's input to the first affordance by initiating the gesture at, or near, the first affordance (e.g., within 0.5 cm, 1 cm, 5 cm, or a distance between 0-5 cm, as measured from an outer edge of the first affordance or a center portion of the first affordance). In some embodiments, the user is further enabled to direct the user's input to the first affordance by paying attention to the first affordance (e.g., gazing at the first affordance) and, while paying attention to the first affordance, the user initiates the gesture (e.g., at any position that is detectable by the computer system). For example, if the user is paying attention to the first affordance, the gesture need not be initiated at a position that is at, or near, the first affordance. Automatically updating a size of a user interface object by allowing a user to perform a pinch input, such as by pinching a corner of the user interface object or performing the pinch input while gazing at the user interface object, and, with the user's same hand, drag the user's hand (e.g., while continuing to perform the pinch input) relative to the user interface object to enlarge or shrink the size of the object, provides additional controls for the user without requiring the user to navigate through complex menu hierarchies, and allows the user to intuitively resize a user interface object by selecting the user interface object (e.g., with a pinch input) and dragging the user's hand to different positions in the three-dimensional environment to change the size accordingly, thereby providing improved visual feedback to the user.

In some embodiments, the computer system receives (e.g., detects) a pinch input with a first hand and a pinch input with a second hand directed to the first user interface object followed by a change in distance between the first hand and the second hand. In some embodiments, in response to the change in distance between the first hand and the second hand, the computer system changes a size of the first user interface object in accordance with the change in distance between the first hand and the second hand. For example, the user performs an input that is a two-handed gesture (e.g., a pinch and drag input). The user pinches the user interface object with the user's first hand, and (e.g., while maintaining the pinch input with the user's first hand), the user performs a pinch input with the user's second hand and moves the user's second hand (e.g., using a drag input) closer to the user's first hand to decrease a size of the user interface object, and moves the user's second hand farther from the user's first hand to increase a size of the user interface object. In some embodiments, the pinch and drag input also causes the first user interface object to move within the three-dimensional environment (e.g., as the first user interface object is dragged to different predefined zones, as described with reference to FIG. 7J). In some embodiments, the pinch input performed with the first hand, is directed to the first user interface object directly (e.g., the user performs the pinch input at a position that corresponds to the first user interface object) or the pinch input is directed to the first user interface object indirectly (e.g., the user performs the pinch input while gazing at the first user interface object, wherein a position of the user's hand while performing the pinch input is not at the position that corresponds to the first user interface object). For example, the user is enabled to direct the user's input to the first user interface object by initiating the gesture at, or near, the first user interface object (e.g., within 0.5 cm, 1 cm, 5 cm, or a distance between 0-5 cm, as measured from an outer edge of the first user interface object or a center portion of the first user interface object). In some embodiments, the user is further enabled to direct the user's input to the first user interface object by paying attention to the first user interface object (e.g., gazing at the first user interface object) and, while paying attention to the first user interface object, the user initiates the gesture (e.g., at any position that is detectable by the computer system). For example, if the user is paying attention to the first user interface object, the gesture need not be initiated at a position that is at, or near, the first user interface object. In some embodiments, the pinch input with the second hand can also be detected directly or indirectly (e.g., the pinch input is initiated at a position that is at, or near, the first user interface object, or the pinch input is initiated at any position while the user is paying attention to the first user interface object). In some embodiments, after the pinch input with the first hand has been detected, the pinch input with the second hand is detected at any position while the pinch input with the first hand is maintained. For example, while the first user interface object is selected (e.g., using the pinch input with the first hand), the pinch input with the second hand is detected at any position (e.g., regardless of whether the user is paying attention to the first user interface object). In some embodiments, the user concurrently resizes and repositions (e.g., moves) the first user interface object in the three-dimensional environment (e.g., using a combination of gestures). For example, the user provides a pinch input, described above, to resize the first user interface object, while providing a drag input (e.g., with the user's second hand) to reposition the user interface object (e.g., by dragging the user interface object to another position in the three-dimensional environment). Automatically updating a size of a user interface object by allowing a user to use two hands, each hand selecting (e.g. pinching) a portion, such as a corner, of the user interface object, and resizing the user interface object based on a change in distance between the user's two hands while the portions of the user interface object are selected, provides additional controls for the user without requiring the user to navigate through complex menu hierarchies, such that the user can intuitively resize a user interface object to increase the size by increasing the distance between the user's hands, or decrease the size by decreasing the distance between the user's hands, thereby providing improved visual feedback to the user.

In some embodiments, deemphasizing the first user interface object relative to the one or more other objects in the three-dimensional environment includes deemphasizing the first user interface object relative to one or more other virtual objects in the three-dimensional environment. For example, one or more other virtual objects including applications (e.g., application windows, application objects), user interface objects (e.g., affordances and/or controls), virtual environments (e.g., immersive experiences), etc. are not visually deemphasized (e.g., remain unmodified), while the first user interface object is visually deemphasized, as described with reference to FIG. 7D. Automatically updating display of certain user interface objects by visually deemphasizing the certain user interface objects relative to other displayed virtual content, when the user is not paying attention to the certain user interface objects, provides real-time visual feedback as the user pays attention to different virtual content in the three-dimensional environment, thereby providing improved visual feedback to the user.

In some embodiments, deemphasizing the first user interface object relative to the one or more other objects in the three-dimensional environment includes deemphasizing the first user interface object relative to representations of one or more physical objects in the physical environment. For example, the one or more physical objects in the physical environment are displayed in the three-dimensional environment as pass-through content (e.g., representation 7014' of a physical object) without being visually deemphasized while the first user interface object 7104-2 is visually deemphasized, as described with reference to FIG. 7D. Automatically updating display of certain user interface objects by visually deemphasizing the certain user interface objects relative to other real-world content from the physical environment that is displayed within the three-dimensional environment, when the user is not paying attention to the certain user interface objects, provides real-time visual feedback as the user pays attention to real and/or virtual content displayed in the three-dimensional environment, thereby providing improved visual feedback to the user.

In some embodiments, the first user interface object includes a plurality of selectable user interface objects. For example, as described with reference to FIG. 7I, the user is enabled to interact with one or more selectable user interface objects displayed within user interface object 7104-7. In some embodiments, the selectable user interface objects are affordances that are selectable using gaze and/or an air gesture. In some embodiments, the first user interface object comprises a panel (e.g., menu) having the plurality of selectable objects. In some embodiments, a first selectable user interface object from the plurality of selectable user interface objects is an application icon, and in response to the user selecting the application icon, the computer system opens (e.g., launches) an application window for an application corresponding to the application icon. In some embodiments, the first selectable user interface object from the plurality of selectable user interface objects is a control for adjusting a setting of the three-dimensional environment (e.g., a volume level, a brightness level, and/or an immersion level), and in response to the user selecting the control for adjusting the setting of the three-dimensional environment, the computer system adjusts the setting in accordance with the user selection. Automatically displaying a plurality of controls that the user can select by gazing and/or performing a gesture directed to the plurality of controls, provides additional controls for the user that are easily accessed by the user within a displayed user interface object (e.g., that follows the user even as the user moves in the physical environment) without requiring the user to navigate through complex menu hierarchies, thereby providing improved visual feedback to the user without requiring additional user input.

In some embodiments, the computer system displays one or more user interface objects for controlling an immersion level of the three-dimensional environment, and, in response to a user input directed to a first user interface object of the one or more user interface objects for increasing a level of immersion of the three-dimensional environment, displays additional virtual content in the three-dimensional environment (e.g., and optionally, ceases display of pass-through content). In some embodiments, in response to detecting a user input directed to a second user interface object of the one or more user interface objects for decreasing a level of immersion of the three-dimensional environment, the computer system displays additional content corresponding to the physical environment (e.g., and, optionally ceases display of virtual content (e.g., one or more virtual objects)). For example, the user is enabled to control how much of the physical environment is displayed in the three-dimensional environment as pass-through content (e.g., during a fully immersive experience, none of the physical environment is displayed (e.g., represented in the three-dimensional environment)). In some embodiments, the one or more user interface objects, described with reference to FIG. 7I, include a control for playing and/or pausing an immersive experience in the three-dimensional environment. In some embodiments, the one or more user interface objects are displayed within the first user interface object (e.g., in a lazy follow zone) such that the one or more user interface objects follow the user as the user moves around the physical environment. Automatically displaying a plurality of controls that allow the user to control an immersive experience of the three-dimensional environment, relative to the physical environment, provides additional controls for the user without requiring the user to navigate through complex menu hierarchies, such that the user can easily control how much content from the physical environment is displayed in the three-dimensional environment, and provides real-time visual feedback to the user as the user requests to change the level of immersion in the three-dimensional environment, thereby providing improved visual feedback to the user without requiring additional user input.

In some embodiments, an amount of deemphasizing the first user interface object relative to the one or more other objects in the three-dimensional environment is based (e.g., at least in part) on an angle between a detected gaze of the user and the first user interface object. For example, the angle is defined as "0" when the viewpoint of the user is directly in front of the user, and as the viewpoint of the user moves (to the left, right, up, or down) relative to the first user interface object, the angle increases as the viewpoint of the user moves away from the first user interface object. For example, the first user interface object is faded/blurred more as the gaze of the user tracks farther away from the first user interface object. In some embodiments, the amount of deemphasizing of the first user interface object is proportional (e.g., linearly, or otherwise) to the amount of the change in angle between the viewpoint of the user and the first user interface object (e.g., as the viewpoint of the user increases the angle, the deemphasis increases). Automatically updating display of certain user interface objects by visually deemphasizing the certain user interface objects by varying amounts based on a perceived angle between the user's current view and the user interface objects, such that user interface objects appear less in focus as the user's current view angles farther away from the user interface object, provides real-time visual feedback as the user's current view of the three-dimensional environment changes and provides the user with a greater awareness of the user's movement relative to the user interface objects, thereby providing improved visual feedback to the user.

In some embodiments, an amount of deemphasizing the first user interface object relative to the one or more other objects in the three-dimensional environment is based (e.g., at least in part) on a rate of the first movement of the viewpoint of the user. For example, the faster the viewpoint of the user is moving (e.g., a quick turn of the head), causes greater deemphasis of the first user interface object. In some embodiments, the amount of deemphasizing of the first user interface object is proportional (e.g., linearly, or non-linearly) to the rate of the movement and/or a direction of movement of the viewpoint of the user (e.g., faster movement causes more deemphasis, slower movement causes less deemphasis, as described above with reference to FIGS. 7D-7G). Automatically updating display of certain user interface objects by visually deemphasizing the certain user interface objects based on how quickly a user is moving in the physical environment, such that objects appear more faded the more quickly the user is moving in the physical environment, provides real-time visual feedback as the user moves at different speeds in the three-dimensional environment, thereby providing improved visual feedback to the user.

In some embodiments, the first user interface object moves within the three-dimensional environment in accordance with movement of the user. For example, the first user interface object is anchored to a position relative to the user's viewpoint such that it appears in a same position relative to the user's viewpoint as the user moves, as described with reference to FIGS. 7C and 7H. Automatically moving certain user interface objects in the three-dimensional environment to follow the user's current viewpoint while the user moves in the physical environment, while maintaining a same relative spatial relationship between the certain user interface objects and the user's viewpoint, provides real-time visual feedback as the user moves around the physical environment and displays user interface objects at a convenient position such that the user is enabled to view and interact with the user interface objects even as the user moves in the physical environment, thereby providing improved visual feedback to the user.

In some embodiments, immediately before and after the first movement of the viewpoint of the user relative to the physical environment, a respective characteristic position of the first user interface object in the three-dimensional environment has a first spatial relationship to a first anchor position in the three-dimensional environment that corresponds to a location of the viewpoint of the user in the physical environment. For example, as described with reference to FIG. 7C, the user interface object 7104-1 is displayed at the respective characteristic position (e.g., relative to the user's viewpoint) before the user moves (in FIGS. 7E-7G), and is redisplayed at the same respective characteristic position as user interface object 7104-6 in FIG. 7H (e.g., after the user has stopped moving in the physical environment). Automatically maintaining certain user interface objects in the three-dimensional environment at a same position relative to the user's current viewpoint, even as the user moves in the physical environment and changes the user's viewpoint, provides real-time visual feedback as the user moves around the physical environment such that the user is enabled to view and interact with the user interface objects even as the user moves in the physical environment, thereby providing improved visual feedback to the user.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 800 described above with respect to FIG. 8. For example, the gestures, inputs, physical objects, user interface objects, movements, criteria, three-dimensional environment, display generation component, representation of physical object, virtual objects, and/or animations described above with reference to method 800 optionally have one or more of the characteristics of the gestures, inputs, physical objects, user interface objects, movements, criteria, three-dimensional environment, display generation component, representation of physical object, virtual objects, and/or animations described herein with reference to other methods described herein (e.g., method 900). For brevity, these details are not repeated here.

Figure 9:
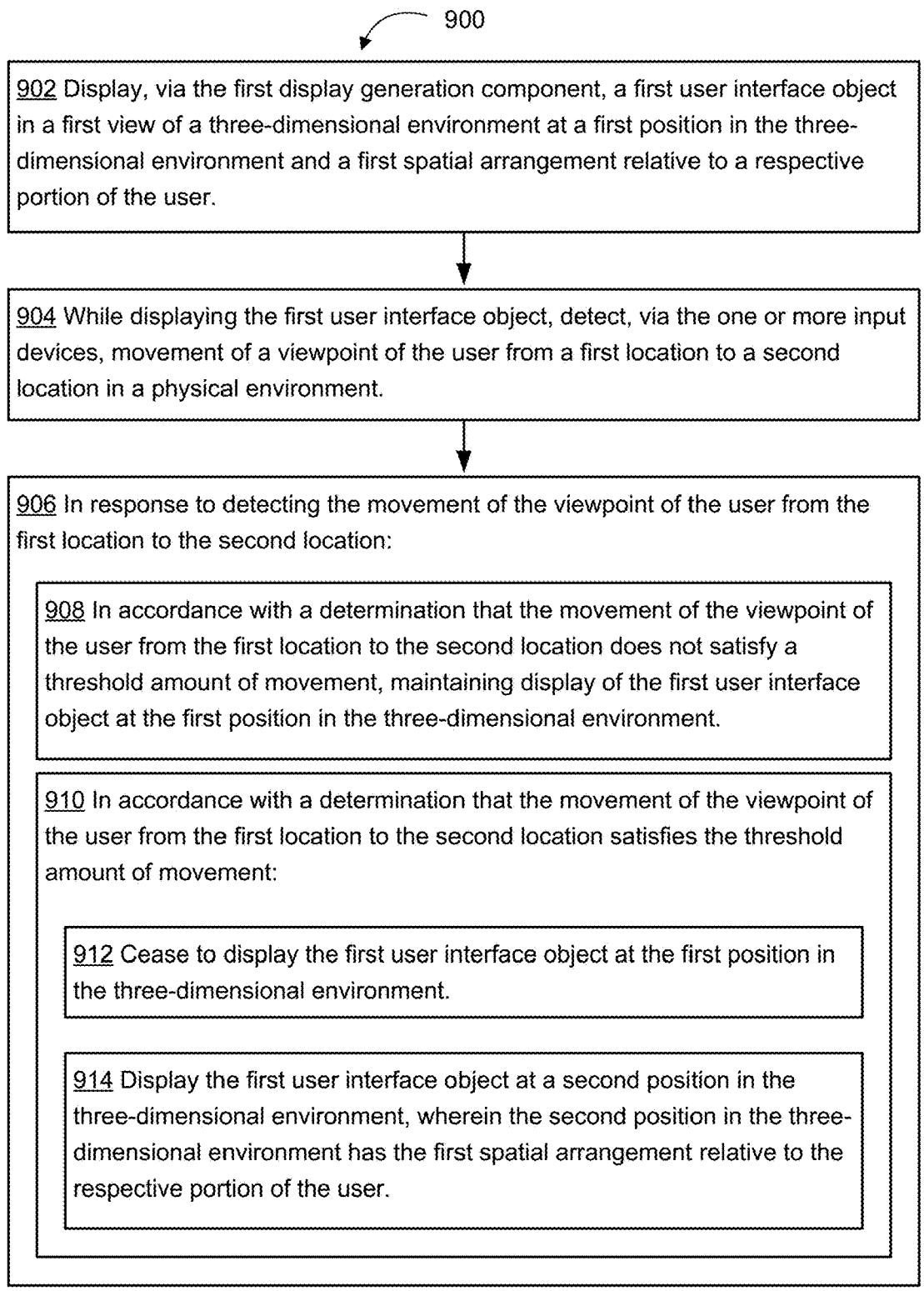
FIG. 9 is a flowchart of a method of updating display of a user interface element in a three-dimensional environment to follow the user as the user changes the user's current view of the three-dimensional environment, in accordance with some embodiments.

FIG. 9 is a flowchart of a method 900 of updating display of a user interface element in a three-dimensional environment to follow the user as the user changes the user's current view of the three-dimensional environment, in accordance with some embodiments.

In some embodiments, the method 900 is performed at a computer system (e.g., computer system 101 in FIG. 1) including a first display generation component (e.g., display generation component 120 in FIGS. 1, 3, and 4) (e.g., a heads-up display, a display, a touchscreen, and/or a projector) and, one or more input devices, such as one or more sensors (e.g., a camera (e.g., color sensors, infrared sensors, and other depth-sensing cameras) that points downward at a user's hand or a camera that points forward from the user's head). In some embodiments, the method 900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 900 are, optionally, combined and/or the order of some operations is, optionally, changed.

In some embodiments, the computer system is in communication with the first display generation component (e.g., the first display generation component is a heads-up display, a head-mounted display (HMD), a display, a touchscreen, and/or a projector) and one or more input devices (e.g., cameras, controllers, touch-sensitive surfaces, joysticks, buttons, gloves, watches, motion sensors, and/or orientation sensors). In some embodiments, the first display generation component is a first display generation component 7100 described with respect to FIGS. 7A-7J. In some embodiments, the computer system is an integrated device with one or more processors and memory enclosed in the same housing as the first display generation component and at least some of the one or more input devices. In some embodiments, the computer system includes a computing component (e.g., a server, a mobile electronic device such as a smart phone or tablet device, a wearable device such as a watch, wristband, or earphones, a desktop computer, and/or a laptop computer) that includes one or more processors and memory that is separate from the first display generation component and/or the one or more input devices. In some embodiments, the first display generation component and the one or more input devices are integrated and enclosed in the same housing. Many of the features of the method 900 are described with respect to FIGS. 7A-7J, in accordance with some embodiments.

The method 900 relates to displaying a user interface element in a three-dimensional environment, where display of the user interface element is updated to follow the user as the user changes the user's current view of the three-dimensional environment (e.g., by moving around a physical environment). The user interface element initially does not move as the user's view changes, until the user's view has changed by more than a threshold amount. After the user's view has changed by more than the threshold amount, the user interface element follows the user (e.g., is delayed in following and/or follows the user at a slower rate of movement than the movement of the user). Automatically changing a displayed location of user interface objects to follow the user as the user's current viewpoint changes from the user moving in the physical environment, provides real-time visual feedback as the user moves around the physical environment. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

The computer system displays (902), via the first display generation component, a first user interface object in a first view of a three-dimensional environment at a first position in the three-dimensional environment and with a first spatial arrangement relative to a respective portion of the user (e.g., relative to a current viewpoint of the user of the three-dimensional environment). For example, as described with reference to FIG. 7C, the user interface object 7104-1 is initially displayed with a first spatial arrangement relative to the user's current position in the physical environment.

While displaying the first user interface object, the computer system detects (904), via the one or more input devices, movement of a viewpoint of the user from a first location to a second location in a physical environment. For example, the user's location optionally includes information related to a three-dimensional position (e.g., coordinates) of the user in the physical environment and information related to the user's pose and/or orientation in the physical environment. In some embodiments, detecting the movement of the viewpoint of the user includes detecting movement of the torso within the physical environment (e.g., wherein the first user interface object is maintained at a same general position with respect to the user's body). For example, as described with reference to FIGS. 7E-7G, the user moves in the physical environment, which causes the user's current view of the three-dimensional environment to change.

In response to detecting the movement of the viewpoint of the user from the first location to the second location (906), in accordance with a determination that the movement of the viewpoint of the user from the first location to the second location does not satisfy a threshold amount (e.g., a threshold amount of change in an angle (orientation) of the user and/or a threshold amount of distance) of movement, the computer system maintains display (908) of the first user interface object at the first position in the three-dimensional environment (e.g., even though the first user interface no longer has the first spatial arrangement relative to the respective portion of the user). For example, as illustrated in FIG. 7E, as the user initially moves in the physical environment (e.g., but does not satisfy the threshold amount of movement), the user interface object 7104-3 remains anchored (e.g., locked) to a same position in the three-dimensional environment.

In response to detecting the movement of the viewpoint of the user from the first location to the second location (906), in accordance with a determination that the movement of the viewpoint of the user from the first location to the second location satisfies (910) the threshold amount of movement, the computer system ceases (912) to display the first user interface object at the first position in the three-dimensional environment and displays (914) the first user interface object at a second position in the three-dimensional environment, wherein the second position in the three-dimensional environment has the first spatial arrangement relative to the respective portion of the user. For example, the position of the user interface object changes within the three-dimensional environment (e.g., the user interface object is not anchored to a position within the three-dimensional environment) but remains at a same relative position with respect to the user after the user has moved at least the threshold amount. For example, as described with reference to FIG. 7C and FIG. 7H, after the threshold amount of movement is satisfied in FIG. 7H, a default position of the first user interface object (e.g., shown in FIG. 7C) relative to the user is restored.

In some embodiments, while maintaining display of the first user interface object at the first position in the three-dimensional environment (e.g., wherein the first position is a fixed position in the three-dimensional environment), the computer system detects that the movement of the viewpoint of the user satisfies the threshold amount of movement. In some embodiments, in response to the movement of the viewpoint of the user satisfying the threshold amount of movement, the computer system moves (e.g., animates movement of) the first user interface object from the first position to the second position in the three-dimensional environment. For example, as described with reference to FIG. 7D, initially, the user moves by less than the threshold amount of movement, and the user interface object is maintained at a same first position fixed in the physical environment, before the user satisfies the threshold amount of movement (e.g., as shown in FIG. 7H); and then (e.g., in accordance with a determination that the amount of movement satisfies the threshold amount of movement) the computer system moves the user interface object to a second position in the three-dimensional environment. Automatically displaying a user interface object at a position that is initially locked with respect to the three-dimensional environment, even as the user moves around the physical environment, before displaying the user interface object moving with the user after the user has moved more than a threshold amount, provides real-time visual feedback as the user moves around the physical environment such that the user interface object is maintained less than a threshold distance away from the user (e.g., because the user interface object will follow the user after the user has moved by at least the threshold amount away from the initial position of the user interface object, and/or after the user's viewpoint has changed by a threshold amount), thereby providing improved visual feedback to the user.

In some embodiments, while displaying the first user interface object at the second position in the three-dimensional environment, the computer system detects, via the one or more input devices, movement of the viewpoint of the user from the second location to a third location in the physical environment. In some embodiments, in response to detecting the movement of the viewpoint of the user from the second location to the third location, in accordance with a determination that the movement of the viewpoint of the user from the second location to the third location does not satisfy a second threshold amount (e.g., the same and/or a different threshold amount of movement than from the first location to the second location) of movement, the computer system maintains display of the first user interface object at the second position in the three-dimensional environment (e.g., even though the first user interface no longer has the first spatial arrangement relative to the respective portion of the user). In some embodiments, in accordance with a determination that the movement of the viewpoint of the user from the second location to the third location satisfies the second threshold amount of movement, the computer system ceases to display the first user interface object at the second position in the three-dimensional environment and displays the first user interface object at a third position in the three-dimensional environment, wherein the third position in the three-dimensional environment has the first spatial arrangement relative to the respective portion of the user (e.g., at the third location). For example, the user interface object continues to have the lazy follow behavior described with reference to FIGS. 7D-7H, even as the user subsequently moves (e.g., or continues to move, continuously or sporadically) in the physical environment. Automatically changing a displayed location of user interface objects to follow the user as the user's current viewpoint changes in accordance with the user moving in the physical environment, provides real-time visual feedback as the user moves around the physical environment.

In some embodiments, while moving the first user interface object from the first position to the second position in the three-dimensional environment, the computer system visually deemphasizes the first user interface object relative to one or more other objects in the three-dimensional environment. For example, as illustrated in FIGS. 7E-7G, while the user is moving, the user interface objects 7104-3 through 7104-5 are visually deemphasized in the three-dimensional environment. Automatically updating display of certain user interface objects by visually deemphasizing the certain user interface objects relative to other displayed content, while the user is moving around the physical environment, provides real-time visual feedback as the user moves around in the three-dimensional environment and reduces an amount of visual load on (e.g., or level of distraction of) the user by displaying the user interface object(s) with less prominence while the user is moving (and not interacting with the user interface object(s)), thereby providing improved visual feedback to the user.

In some embodiments, visually deemphasizing the first user interface object comprises displaying the first user interface object with reduced opacity, as described above with reference to FIGS. 7D-7E. For example, while the first user interface object is visually deemphasized (e.g., while the user is moving), the first user interface object appears more translucent (e.g., faded) relative to other objects displayed in the three-dimensional environment. Automatically updating display of certain user interface objects by reducing the opacity of the certain user interface objects relative to other displayed content, while the user is moving around the physical environment, provides real-time visual feedback as the user moves around in the three-dimensional environment and reduces an amount of visual load on (e.g., or level of distraction of) the user by displaying the user interface object(s) with less prominence while the user is moving (e.g., and not interacting with the user interface object(s)), thereby providing improved visual feedback to the user.

In some embodiments, visually deemphasizing the first user interface object comprises displaying the first user interface object with a blurred visual effect, as described above with reference to FIGS. 7D-7E. For example, the first user interface object appears blurred relative to other objects displayed in the three-dimensional environment (e.g., while the user is moving). Automatically updating display of certain user interface objects by blurring the certain user interface objects relative to other displayed content, while the user is moving around the physical environment, provides real-time visual feedback as the user moves around in the three-dimensional environment and reduces an amount of visual load on (e.g., or level of distraction of) the user by displaying the user interface object(s) with less prominence while the user is moving (e.g., and not interacting with the user interface object(s)), thereby providing improved visual feedback to the user.

In some embodiments, in accordance with a determination that the user does not satisfy attention criteria with respect to the first user interface object, the computer system visually deemphasizes the first user interface object relative to one or more other objects in the three-dimensional environment, as described with reference to FIG. 7D. Automatically updating display of certain user interface objects by visually deemphasizing the certain user interface objects relative to other displayed content, when the user is not paying attention to the certain user interface objects, provides real-time visual feedback as the user pays attention to different virtual content in the three-dimensional environment and reduces an amount of visual load on (e.g., or level of distraction of) the user by displaying the user interface object(s) with less prominence relative to other content while the user is not paying attention to the user interface object(s), thereby providing improved visual feedback to the user.

In some embodiments, the attention criteria with respect to the first user interface object includes a gaze criterion, as described above with reference to FIG. 7D. For example, the user satisfies the gaze criterion in accordance with a determination that the user has gazed (e.g., looked at) the first user interface object for at least a threshold amount of time. Automatically determining whether the user is paying attention to a certain user interface object by detecting whether the user is gazing at the user interface object, and updating the display of the user interface object automatically when the user is gazing at the user interface object, without requiring additional input from the user, provides additional controls for the user without requiring the user to navigate through complex menu hierarchies, thereby providing improved visual feedback to the user without requiring additional user input.

In some embodiments, the attention criteria with respect to the first user interface object includes a criterion for a position of the head of the user in the physical environment, as described above with reference to FIG. 7D. For example, the criterion for the position of the head of the user is satisfied in accordance with a determination that the user's current head position matches a predefined head position and/or that the user's head position has remained at a predefined head position for at least a threshold amount of time. Automatically determining whether the user is paying attention to a certain user interface object by detecting whether the user's head is at a particular position, such as turned toward the user interface object, and updating the display of the user interface object automatically when the user's head is at the particular position, without requiring additional input from the user, provides additional controls for the user without requiring the user to navigate through complex menu hierarchies, thereby providing improved visual feedback to the user without requiring additional user input.

In some embodiments, an amount of visual deemphasizing of the first user interface object is based (e.g., at least in part) on a rate of the movement of the viewpoint of the user. For example, the first user interface object appears to fade (e.g., be displayed with reduced opacity) and/or appear more blurred as the user is moves faster within the physical environment. In some embodiments, the visual deemphasis is gradual (e.g., the first user interface object appears more faded over a time period), such that, as the user moves for a longer period of time, the amount of visual deemphasis is increased. In some embodiments, the rate of the amount of visual deemphasis during the gradual deemphasizing is based on the rate of movement of the viewpoint of the user (e.g., the rate of the amount of visual deemphasis is proportional to the rate of movement of the user). For example, an increased rate of movement of the viewpoint of the user results in an increased amount of fade and/or blur. Automatically updating display of certain user interface objects by visually deemphasizing the certain user interface objects relative to other displayed content with an amount of visual deemphasis that is determined based on a speed of the user's movement, while the user is moving around the physical environment, such that the certain user interface objects appear more deemphasized the faster the user moves, provides real-time visual feedback as the user moves around in the three-dimensional environment at different speeds, thereby providing improved visual feedback to the user.

In some embodiments, while displaying the first user interface object, the computer system displays a second user interface object (e.g., a virtual object, an application, or a representation of a physical object, such as representation 7014' of a physical object) at a fourth position in the first view of the three-dimensional environment, the fourth position having a second spatial arrangement relative to a location within the three-dimensional environment. For example, the second user interface object is anchored to an object or a portion of the three-dimensional environment such that the second user interface object does not move (e.g., is maintained at a same position within the three-dimensional environment) as the viewpoint of the user moves. Automatically displaying one or more user interface objects at a position that is locked with respect to the three-dimensional environment, even as the user moves around the three-dimensional environment, without locking certain other user interface objects that follow the user as the user moves, provides real-time visual feedback as the user moves around the physical environment, such that the user knows where, within the three-dimensional environment, the locked user interface elements are located relative to the three-dimensional environment, and so that the user is enabled to view or interact with the locked user interface elements by returning to the anchored locations in the three-dimensional environment, thereby providing improved visual feedback to the user.

In some embodiments, while displaying the first user interface object, the computer system displays a third user interface object at a fifth position in the first view of the three-dimensional environment, the third user interface object having a third spatial arrangement relative to a respective portion of the user (e.g., relative to a portion of the user's body (e.g., head, torso), or relative to the user's viewpoint). For example, the third user interface object is anchored to the user's hand, such that as the user moves in the physical environment, the third user interface object is displayed at a position that is anchored to the user's hand (e.g., that is displayed in response to the user raising the user's hand to be within the user's current view of the three-dimensional environment). Automatically displaying one or more user interface objects at a position that is maintained in a same general location (e.g., or locked) with respect to a portion of the user's body, even as the user moves around the three-dimensional environment, without locking certain other user interface objects to the user's body portion as the user moves, provides real-time visual feedback as the user moves around the physical environment, thereby providing improved visual feedback to the user.

In some embodiments, in response to detecting a user input to reposition the first user interface object to a sixth position in the three-dimensional environment, the computer system moves the first user interface object to the sixth position in the three-dimensional environment, the sixth position having a fourth spatial arrangement relative to the respective portion of the user and updates, for the first user interface object, the first spatial arrangement relative to the respective portion of the user of the first user interface object to the fourth spatial arrangement relative to the respective portion of the user. For example, as described with reference to FIG. 7J, the first user interface object 7104-8 is placed in (e.g., repositioned and anchored to) a different zone that has a different spatial arrangement relative to the user (e.g., instead of being positioned at a first distance and at a first angle relative to (e.g., directly in front of) the user (e.g., user's torso, user's head, user's viewpoint), the new zone is in the left hand corner defined at a different angle and/or distance from the portion of the user (e.g., the fourth spatial arrangement). In some embodiments, after updating the first user interface object to have the fourth spatial arrangement, in response to the movement of the viewpoint of the user satisfying the threshold amount of movement, the first user interface object is maintained with the fourth spatial arrangement relative to the respective portion of the user (e.g., and continues to have the lazy follow behavior described above). Allowing a user to change an anchor position of certain user interface objects to have a different spatial relationship relative to the user's current view, such that the certain user interface objects are maintained at a same position relative to the user's current view, even as the user's current view changes, provides real-time visual feedback as the user moves in the physical environment and makes it easy for the user to place the certain user interface objects at a position that is most comfortable or convenient for the user to view, thereby providing improved visual feedback to the user.

In some embodiments, the sixth position in the three-dimensional environment is within a predefined distance from the user, and, in response to detecting a user input to reposition the first user interface object to a seventh position in the three-dimensional environment, the seventh position in the three-dimensional environment exceeding the predefined distance from the user, the computer system moves the first user interface object to the seventh position, wherein, at the seventh position, the first user interface object is anchored to a portion of the three-dimensional environment. For example, the user is enabled to place the first user interface object at a position in the three-dimensional space that is outside of any of the predefined zones. In some embodiments, in accordance with a determination that the user has placed the first user interface object at a position in the three-dimensional environment (e.g., at the seventh position) such that the first user interface object is anchored to the three-dimensional environment (e.g., and its position is independent of the current viewpoint of the user, such that the first user interface object does not maintain a respective spatial relationship to the respective portion of the user while the user moves the user's current viewpoint of the three-dimensional environment), the first user interface object no longer has the lazy follow behavior. In some embodiments, in response to the user placing the first user interface object at the seventh position that is outside of the predefined distance from the user (e.g., outside an arm's reach of the user), a textual indication is displayed to indicate that the first user interface object will not have the lazy follow behavior while the object is placed at the seventh position. In some embodiments, the sixth position cannot be at a distance that exceeds the predefined distance. For example, the sixth position is within arm's reach of the user (e.g., the predefined zones are within an arm's reach of the user), in order for the user interface object to continue having the lazy follow behavior while the user interface object is placed at the sixth position. Automatically providing the user with an option to change an anchor of certain user interface objects to have a different spatial relationship relative to the user's current view that is within a predefined distance (e.g., within an arm's reach) from the user, while allowing the user to position (e.g., or reposition) other user interface objects to positions (e.g., beyond the predefined distance) anchored to the three-dimensional environment, allows the user to place objects in an area that is most comfortable or convenient for the user, and provides real-time visual feedback as the user moves in the physical environment, thereby providing improved visual feedback to the user.

In some embodiments, while detecting a user input to reposition the first user interface object to an eighth position in the three-dimensional environment, the computer system displays a visual indication for one or more predefined zones. In some embodiments, in accordance with a determination that the eighth position is within a predefined zone of the one or more predefined zones, the eighth position having a fifth spatial arrangement relative to the respective portion of the user, in response to detecting movement of the viewpoint of the user, the computer system displays the first user interface object at a ninth position in the three-dimensional environment that has the fifth spatial arrangement relative to the respective portion of the user. In some embodiments, in accordance with a determination that eighth position is not within a predefined zone of the one or more predefined zones, in response to detecting movement of the viewpoint of the user, the computer system maintains display of the first user interface object at the eighth position in the three-dimensional environment. For example, as described with reference to FIG. 7J, if the user repositions the first user interface object outside of a predefined zone, the first user interface object no longer has the lazy follow behavior (e.g., the user interface object becomes anchored to the three-dimensional environment and no longer maintains the first user interface object as having the first spatial arrangement relative to the respective portion of the user). For example, user interface objects that are placed outside of any of the predefined zones will not follow the viewpoint of the user as the viewpoint of the user moves (e.g., user interface objects that are placed outside of the predefined zones are anchored to the three-dimensional environment). In some embodiments, as described with reference to FIG. 7J, the computer system displays an outline (e.g., or other visual indication) of the predefined zones (e.g., the lazy follow zones). In some embodiments, user interface objects that are placed in any of the predefined zones will follow the viewpoint of the user as the viewpoint of the user moves. In some embodiments, the visual indication of the predefined zone is displayed while the user is moving the first user interface object (e.g., in response to the user initiating a gesture for repositioning the first user interface object). Automatically displaying outlines of a plurality of zones within the three-dimensional environment, each zone having a different relative position to the user's current view, makes it easy for the user to select a zone in which to anchor certain user interface objects, so that the user interface objects will follow the user as the user moves in the physical environment when the user interface objects are placed within a zone, and allows the user to more easily determine where to position a user interface object within the three-dimensional environment that is most comfortable or convenient for the user to view, thereby providing improved visual feedback to the user.

In some embodiments, in response to detecting the user input to reposition the first user interface object to the sixth position, the first user interface object snaps to the sixth position in the three-dimensional environment. For example, as described with reference to FIG. 7J, snapping the user interface object to the sixth position comprises, while detecting the user input to reposition the first user interface object to the sixth position, in accordance with a determination that the first user interface object is moved within a predefined threshold distance from the sixth position, automatically moving the user interface object to the sixth position (e.g., without the user continuing to drag the first user interface object toward the sixth position). In some embodiments, in response to a user input to move the first user interface object out of the sixth position (e.g., out of a predefined zone), the first user interface object remains displayed at the sixth position until the user input moves by more than a threshold amount of movement away from the sixth position. In some embodiments, in response to the first user interface object snapping to the sixth position, a haptic and/or audio indication is provided (e.g., concurrently while displaying the first user interface object at the sixth position). For example, the user input is a pinch gesture (e.g., or a pinch and drag gesture) that includes movement of two or more fingers of a hand to make contact with one another, or to break contact from each other (e.g., and optionally, in conjunction with (e.g., followed by) a drag input that changes a position of the user's hand from a first position (e.g., a start position of the drag) to a second position (e.g., an end position of the drag)). In some embodiments, the user maintains the pinch gesture while performing the drag input, and releases the pinch gesture (e.g., opens their two or more fingers) to end the drag gesture (e.g., at the second position). For example, the pinch input selects the first user interface object, and the user is enabled to, once selected, drag the first user interface object to reposition the first user interface object to the sixth position (e.g., or near the sixth position before the user interface objects is snapped to the sixth position). In some embodiments, the pinch input is directed to the first user interface object directly (e.g., the user performs the pinch input at a position that corresponds to the first user interface object), or the pinch input is directed to the first user interface object indirectly (e.g., the user performs the pinch input while gazing at the first affordance, wherein a position of the user's hand while performing the pinch input is not at the position that corresponds to the first user interface object). For example, the user is enabled to direct the user's input to the first user interface object by initiating the gesture at, or near, the first user interface object (e.g., within 0.5 cm, 1 cm, 5 cm, or a distance between 0-5 cm, as measured from an outer edge of the first user interface object or a center portion of the first user interface object). In some embodiments, the user is further enabled to direct the user's input to the first user interface object by paying attention to the first user interface object (e.g., gazing at the first user interface object) and, while paying attention to the first user interface object, the user initiates the gesture (e.g., at any position that is detectable by the computer system). For example, if the user is paying attention to the first user interface object, the gesture need not be initiated at a position that is at, or near, the first user interface object (e.g., the user performs the drag gesture while gazing at the first user interface object). Automatically snapping a user interface object in response to the user repositioning the user interface object within a predefined distance of the snap position, such that the user interface object is moved into the predefined snap position without requiring the user to align the user interface object precisely over the snap position, provides real-time visual feedback to the user as the user repositions the user interface object and provides a visual indication confirming that the user interface object has been successfully repositioned into the snap position, thereby providing improved visual feedback to the user.

In some embodiments, the computer system displays one or more user interface objects for controlling an immersion level of the three-dimensional environment. In some embodiments, in response to a user input directed to a first user interface object of the one or more user interface objects for increasing a level of immersion of the three-dimensional environment, the computer system displays additional virtual content in the three-dimensional environment (e.g., and optionally, ceasing or reducing display of pass-through content). In some embodiments, in response to detecting a user input directed to a second user interface object of the one or more user interface objects for decreasing a level of immersion of the three-dimensional environment, the computer system displays additional content corresponding to the physical environment (e.g., displays additional pass-through content and, optionally, ceases or reduces display of virtual content (e.g., one or more virtual objects)). In some embodiments, the one or more user interface objects includes a control for playing and/or pausing an immersive experience in the three-dimensional environment. For example, the user is enabled to control how much of the physical environment is displayed in the three-dimensional environment as pass-through content (e.g., during a fully immersive experience, none of the physical environment is displayed (e.g., or otherwise represented in the three-dimensional environment)). For example, the user input is a tap input (e.g., an air gesture, or a pinch gesture) that is, optionally, a tap input of a thumb over index finger (e.g., over a side of the index finger adjacent to the thumb) of a user's hand. In some embodiments, a tap input is detected without requiring lift-off of the thumb from the side of the index finger. For example, the user performs a tap input directed to the first user interface object to increase the level of immersion of the three-dimensional environment. In some embodiments, the user input is directed to the first user interface object directly (e.g., the user performs the tap input at a position that corresponds to the first user interface object), or the user input is directed to the first user interface object indirectly (e.g., the user performs the tap input while gazing at the first affordance, wherein a position of the user's hand while performing the tap input is not at the position that corresponds to the first user interface object). For example, the user is enabled to direct the user's input to the first user interface object by initiating the gesture at, or near, the first user interface object (e.g., within 0.5 cm, 1 cm, 5 cm, or a distance between 0-5 cm, as measured from an outer edge of the first user interface object or a center portion of the first user interface object). In some embodiments, the user is further enabled to direct the user's input to the first user interface object by paying attention to the first user interface object (e.g., gazing at the first user interface object) and, while paying attention to the first user interface object, the user initiates the gesture (e.g., at any position that is detectable by the computer system). For example, if the user is paying attention to the first user interface object, the gesture need not be initiated at a position that is at, or near, the first user interface object. Automatically displaying a plurality of controls that allow the user to control an immersive experience of the three-dimensional environment, relative to the physical environment, provides additional controls for the user without requiring the user to navigate through complex menu hierarchies, such that the user can easily control how much content from the physical environment is displayed in the three-dimensional environment, and provides real-time visual feedback to the user as the user requests to change the level of immersion in the three-dimensional environment, thereby providing improved visual feedback to the user without requiring additional user input.

In some embodiments, the computer system displays one or more user interface objects for controlling an experience in the three-dimensional environment. In some embodiments, in response to a user input directed to a first user interface object of the one or more user interface objects, the computer system performs a first operation changing content (e.g., playing or pausing first content) in the three-dimensional environment. In some embodiments, in response to detecting a user input directed to a second user interface object of the one or more user interface objects, the computer system performs a second operation in the three-dimensional environment that is different from the first operation (e.g., pausing or playing second content). In some embodiments, the one or more user interface objects includes a control for playing and/or pausing an immersive experience in the three-dimensional environment. For example, the computer system, in response to the user selecting the first user interface object, displays a first type of virtual wallpaper (corresponding to a first type of virtual experience) to the three-dimensional environment. In response to the user selecting the second user interface object, the computer system displays the three-dimensional environment with a virtual lighting effect. For example, the user input is a tap input (e.g., an air gesture, or a pinch gesture) that is, optionally, a tap input of a thumb over index finger (e.g., over a side of the index finger adjacent to the thumb) of a user's hand. In some embodiments, a tap input is detected without requiring lift-off of the thumb from the side of the index finger. For example, the user performs a tap input directed to the first user interface object to play (e.g., or pause) virtual content that is displayed in the three-dimensional environment. In some embodiments, the user input is directed to the first user interface object directly (e.g., the user performs the tap gesture at a position that corresponds to the first user interface object), or the user input is directed to the first user interface object indirectly (e.g., the user performs the tap input while gazing at the first affordance, wherein a position of the user's hand while performing the tap input is not at the position that corresponds to the first user interface object). For example, the user is enabled to direct the user's input to the first user interface object by initiating the gesture at, or near, the first user interface object (e.g., within 0.5 cm, 1 cm, 5 cm, or a distance between 0-5 cm, as measured from an outer edge of the first user interface object or a center portion of the first user interface object). In some embodiments, the user is further enabled to direct the user's input to the first user interface object by paying attention to the first user interface object (e.g., gazing at the first user interface object) and, while paying attention to the first user interface object, the user initiates the gesture (e.g., at any position that is detectable by the computer system). For example, if the user is paying attention to the first user interface object, the gesture need not be initiated at a position that is at, or near, the first user interface object. Accordingly, the user interface objects correspond to controls for changing (e.g., displaying or ceasing to display) various virtual content for a virtual experience in the three-dimensional environment. In some embodiments, in response to selecting a play control user interface object, virtual content for the virtual experience is displayed, and in response to selecting a pause control user interface object, virtual content for the virtual experience is ceased to be displayed. Automatically displaying a plurality of controls that allow the user to control an immersive experience of the three-dimensional environment, relative to the physical environment, provides additional controls for the user without requiring the user to navigate through complex menu hierarchies, such that the user can easily control how much content from the physical environment is displayed in the three-dimensional environment, and provides real-time visual feedback to the user as the user requests to change the level of immersion in the three-dimensional environment, thereby providing improved visual feedback to the user without requiring additional user input.

In some embodiments, in response to the movement of the viewpoint of the user satisfying the threshold amount of movement, in accordance with a determination that the body (e.g., torso, head, or hand) of the user moves in the physical environment, the computer system moves the first user interface object from the first position to the second position in the three-dimensional environment. In some embodiments, in accordance with a determination that a head of the user moves from a first head position to a second head position in the physical environment (e.g., without detecting movement of the body of the user (e.g., only detecting a head turn)), the computer system ceases to display the first user interface object at the first position in the three-dimensional environment, and (e.g., after ceasing to display the first user interface object at the first position), displays the first user interface object at the second position in the three-dimensional environment (e.g., without animating the movement). In some embodiments, the user's head must also stay at the second head position for at least a threshold amount of time (e.g., 1 second, 2 seconds, 10 seconds, or an amount of time between 0.5 and 10 seconds) before the first user interface object is displayed at the second position in the three-dimensional environment. In some embodiments, in response to the user moving the user's body (e.g., torso, head, or hand) in the physical environment, the first user interface object is continued to be displayed and is animated to move with the movement of the body of the user, whereas in response to detecting a turning of the user's head (e.g., without moving the user's body), which changes the viewpoint of the user, the user interface object disappears and is redisplayed at the new viewpoint (when the head has remained turned to the new viewpoint). In some embodiments, as described above with reference to the method 800, and FIGS. 7C-7H, determining that the head of the user moves from the first head position to the second head position includes detecting that the user does not satisfy attention criteria with respect to the first user interface object, and, in response to detecting that the user does not satisfy the attention criteria with respect to the first user interface object, the first user interface object is displayed with a modified appearance (e.g., faded, no longer displayed, or otherwise visually deemphasized). In some embodiments, displaying the first user interface object at the second position in the three-dimensional environment is performed in response to detecting that the user satisfies the attention criteria with respect to the first user interface object (e.g., as described with reference to FIG. 7H). Automatically displaying certain user interface objects in the three-dimensional environment as moving while the user's torso moves in the physical environment, without displaying the certain user interface objects in the three-dimensional environment when the user's head moves without moving the user's torso, provides real-time visual feedback as the user moves within the physical environment, thereby providing improved visual feedback to the user.

In some embodiments, after the determination that the movement satisfies the threshold amount, the first user interface object is displayed at a plurality of respective positions in the three-dimensional environment as the viewpoint of the user moves relative to the physical environment, wherein at a first position of the plurality of respective positions, the first user interface object has (e.g., continues to have) the first spatial arrangement relative to the respective portion of the user and at a second position of the plurality of respective positions, the first user interface object has (e.g., continues to have) the first spatial arrangement relative to the respective portion of the user. For example, the plurality of respective positions in the three-dimensional environment applies to any number of locations within the three-dimensional environment (e.g., the first user interface object is enabled to be displayed at any portion of the three-dimensional environment that is within the current viewpoint of the user to maintain the first spatial arrangement relative to the respective portion of the user). As such, as the user moves in the physical environment, the first user interface object is enabled to be displayed at a variety of positions in the three-dimensional environment, to appear as if the first user interface object is continually moving in the three-dimensional environment as the user moves. For example, in FIGS. 7E-7G, the user interface object is displayed at additional positions as the user continues to move in the physical environment. Automatically moving certain user interface objects in the three-dimensional environment to follow the user's current viewpoint while the user moves in the physical environment, while maintaining a same spatial relationship between the certain user interface objects and the user's viewpoint, provides real-time visual feedback as the user moves around the physical environment, thereby providing improved visual feedback to the user.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 900 described above with respect to FIG. 9. For example, the gestures, inputs, physical objects, user interface objects, movements, criteria, three-dimensional environment, display generation component, representation of physical object, virtual objects, and/or animations described above with reference to method 900 optionally have one or more of the characteristics of the gestures, inputs, physical objects, user interface objects, movements, criteria, three-dimensional environment, display generation component, representation of physical object, virtual objects, and/or animations described herein with reference to other methods described herein (e.g., method 800). For brevity, these details are not repeated here.

The operations described above with reference to FIGS. 8 and 9 are, optionally, implemented by components depicted in FIGS. 1-6. In some embodiments, aspects/operations of methods 800 and 900 may be interchanged, substituted, and/or added between these methods. For brevity, these details are not repeated here.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a computer system that is in communication with a first display generation component and one or more input devices:
   displaying, via the first display generation component, a first user interface object in a first view of a three-dimensional environment corresponding to a first viewpoint of a user of the computer system relative to a physical environment;
   while displaying the first user interface object, detecting, via the one or more input devices, whether the user of the computer system satisfies attention criteria with respect to the first user interface object;
   in response to detecting that the user does not satisfy the attention criteria with respect to the first user interface object, displaying the first user interface object with a modified appearance, wherein displaying the first user interface object with the modified appearance includes deemphasizing the first user interface object relative to one or more other objects in the three-dimensional environment;
   while displaying the first user interface object with the modified appearance, detecting, via the one or more input devices, a first movement of a viewpoint of the user to a second viewpoint of the user relative to the physical environment;
   after detecting the first movement of the viewpoint of the user relative to the physical environment:
   while displaying a second view of the three-dimensional environment, corresponding to the second viewpoint of the user and distinct from the first view of the three-dimensional environment:
   maintaining display of the first user interface object with the modified appearance in accordance with a determination that the user does not satisfy the attention criteria; and subsequently
   detecting that the user satisfies the attention criteria with respect to the first user interface object; and
   in response to detecting that the user satisfies the attention criteria, displaying the first user interface object in the second view of the three-dimensional environment, wherein displaying the first user interface object in the second view of the three-dimensional environment includes displaying the first user interface object with an appearance that emphasizes the first user interface object relative to one or more other objects in the three-dimensional environment more than when the first user interface object was displayed with the modified appearance.

2. The method of claim 1, wherein the first user interface object has a first spatial relationship to a first anchor position in the three-dimensional environment that corresponds to a location of the user in the physical environment.

3. The method of claim 1, further comprising, after detecting the first movement of the viewpoint of the user relative to the physical environment, maintaining display of the first user interface object at a same anchor position in the three-dimensional environment.

4. The method of claim 1, further comprising:
   after detecting the first movement of the viewpoint of the user relative to the physical environment:
   in accordance with a determination that the first movement satisfies a non-zero time threshold, moving the first user interface object in the three-dimensional environment to a same position relative to the viewpoint of the user.

5. The method of claim 4, wherein the first user interface object moves within the three-dimensional environment in accordance with movement of the user.

6. The method of claim 1, further comprising:
   receiving a user input to reposition the first user interface object in the three-dimensional environment;
   in response to receiving the user input to reposition the first user interface object in the three-dimensional environment, repositioning the first user interface object to a respective position in the three-dimensional environment in accordance with the user input; and
   after repositioning the first user interface object to the respective position in the three-dimensional environment in accordance with the user input, detecting an input to change a viewpoint of the user; and
   in response to detecting the input to change the viewpoint of the user, changing the viewpoint of the user in accordance with the input to change the viewpoint of the user and displaying the first user interface object in the three-dimensional environment from a current viewpoint of the user, including:
   in accordance with a determination that the first user interface object is positioned within a first predefined zone, displaying the first user interface object at a respective position that has a first spatial relationship to a first anchor position in the three-dimensional environment that corresponds to a location of the viewpoint of the user in the physical environment; and
   in accordance with a determination that the first user interface object is not positioned within the first predefined zone, maintaining display of the first user interface object at a same anchor position in the three-dimensional environment that does not correspond to a location of the user in the physical environment.

7. The method of claim 6, wherein the first predefined zone is selected from a plurality of predefined zones in the three-dimensional environment, wherein:
   the first predefined zone has the first spatial relationship relative to the first anchor position in the three-dimensional environment that corresponds to a location of the viewpoint of the user, and
   a second predefined zone of the plurality of predefined zones has a second spatial relationship relative to a second anchor position in the three-dimensional environment that corresponds to a location of the viewpoint of the user.

8. The method of claim 6, further comprising:
   in response to detecting the user initiating the user input to reposition the first user interface object, displaying a visual indication for the first predefined zone; and while detecting the user input to reposition the first user interface object to the first predefined zone, maintaining display of the visual indication for the first predefined zone.

9. The method of claim 1, wherein the attention criteria with respect to the first user interface object includes a gaze criterion.

10. The method of claim 1, wherein the attention criteria with respect to the first user interface object includes a criterion for a position of the head of the user in the physical environment.

11. The method of claim 1, further comprising:
detecting a pinch input directed to a first affordance displayed on at least a portion of the first user interface object followed by movement of a hand that performed the pinch input; and
in response to the movement of the hand, changing a size of the first user interface object in accordance with the movement of the hand.

12. The method of claim 1, further comprising:
receiving a pinch input with a first hand and a pinch input with a second hand directed to the first user interface object followed by a change in distance between the first hand and the second hand; and
in response to the change in distance between the first hand and the second hand, changing a size of the first user interface object in accordance with the change in distance between the first hand and the second hand.

13. The method of claim 1, wherein deemphasizing the first user interface object relative to one or more other objects in the three-dimensional environment includes deemphasizing the first user interface object relative to one or more other virtual objects in the three-dimensional environment.

14. The method of claim 1, wherein deemphasizing the first user interface object relative to one or more other objects in the three-dimensional environment includes deemphasizing the first user interface object relative to representations of one or more physical objects in the physical environment.

15. The method of claim 1, wherein the first user interface object includes a plurality of selectable user interface objects.

16. The method of claim 1, further comprising:
displaying one or more user interface objects for controlling an immersion level of the three-dimensional environment;
in response to a user input directed to a first user interface object of the one or more user interface objects for increasing a level of immersion of the three-dimensional environment, displaying additional virtual content in the three-dimensional environment; and
in response to detecting a user input directed to a second user interface object of the one or more user interface objects for decreasing a level of immersion of the three-dimensional environment, displaying additional content corresponding to the physical environment.

17. The method of claim 1, wherein an amount of deemphasizing the first user interface object relative to one or more other objects in the three-dimensional environment is based on an angle between a detected gaze of the user and the first user interface object.

18. The method of claim 1, wherein an amount of deemphasizing the first user interface object relative to one or more other objects in the three-dimensional environment is based on a rate of the first movement of the viewpoint of the user.

19. The method of claim 1, wherein, before and after the first movement of the viewpoint of the user relative to the physical environment, a respective characteristic position of the first user interface object in the three-dimensional environment has a first spatial relationship to a first anchor position in the three-dimensional environment that corresponds to a location of the viewpoint of the user in the physical environment.

20. A computer system, comprising:
a first display generation component;
one or more input devices;
one or more processors; and
memory storing one or more programs, wherein the one or more programs are configured to be executed by the one or more processors, the one or more programs including instructions for:
displaying, via the first display generation component, a first user interface object in a first view of a three-dimensional environment corresponding to a first viewpoint of a user of the computer system relative to a physical environment;
while displaying the first user interface object, detecting, via the one or more input devices, whether the user of the computer system satisfies attention criteria with respect to the first user interface object;
in response to detecting that the user does not satisfy the attention criteria with respect to the first user interface object, displaying the first user interface object with a modified appearance, wherein displaying the first user interface object with the modified appearance includes deemphasizing the first user interface object relative to one or more other objects in the three-dimensional environment;
while displaying the first user interface object with the modified appearance, detecting, via the one or more input devices, a first movement of a viewpoint of the user to a second viewpoint of the user relative to the physical environment;
after detecting the first movement of the viewpoint of the user relative to the physical environment:
while displaying a second view of the three-dimensional environment, corresponding to the second viewpoint of the user and distinct from the first view of the three-dimensional environment:
maintaining display of the first user interface object with the modified appearance in accordance with a determination that the user does not satisfy the attention criteria; and subsequently
detecting that the user satisfies the attention criteria with respect to the first user interface object; and
in response to detecting that the user satisfies the attention criteria, displaying the first user interface object in the second view of the three-dimensional environment, wherein displaying the first user interface object in the second view of the three-dimensional environment includes displaying the first user interface object with an appearance that emphasizes the first user interface object relative to one or more other objects in the three-dimensional environment more than when the first user interface object was displayed with the modified appearance.

21. A non-transitory computer readable storage medium storing one or more programs, the one or more programs comprising instructions that, when executed by a computer system that includes a first display generation component and one or more input devices, cause the computer system to perform operations including:

displaying, via the first display generation component, a first user interface object in a first view of a three-dimensional environment corresponding to a first viewpoint of a user of the computer system relative to a physical environment;

while displaying the first user interface object, detecting, via the one or more input devices, whether the user of the computer system satisfies attention criteria with respect to the first user interface object;

in response to detecting that the user does not satisfy the attention criteria with respect to the first user interface object, displaying the first user interface object with a modified appearance, wherein displaying the first user interface object with the modified appearance includes deemphasizing the first user interface object relative to one or more other objects in the three-dimensional environment;

while displaying the first user interface object with the modified appearance, detecting, via the one or more input devices, a first movement of a viewpoint of the user to a second viewpoint of the user relative to the physical environment;

after detecting the first movement of the viewpoint of the user relative to the physical environment:

while displaying a second view of the three-dimensional environment, corresponding to the second viewpoint of the user and distinct from the first view of the three-dimensional environment:

maintaining display of the first user interface object with the modified appearance in accordance with a determination that the user does not satisfy the attention criteria; and subsequently detecting that the user satisfies the attention criteria with respect to the first user interface object; and in response to detecting that the user satisfies the attention criteria, displaying the first user interface object in the second view of the three-dimensional environment, wherein displaying the first user interface object in the second view of the three-dimensional environment includes displaying the first user interface object with an appearance that emphasizes the first user interface object relative to one or more other objects in the three-dimensional environment more than when the first user interface object was displayed with the modified appearance.

22. The non-transitory computer readable storage medium of claim 21, wherein the first user interface object has a first spatial relationship to a first anchor position in the three-dimensional environment that corresponds to a location of the user in the physical environment.

23. The non-transitory computer readable storage medium of claim 21, the one or more programs further comprising instructions that cause the computer system to perform operations including, after detecting the first movement of the viewpoint of the user relative to the physical environment, maintaining display of the first user interface object at a same anchor position in the three-dimensional environment.

24. The non-transitory computer readable storage medium of claim 21, the one or more programs further comprising instructions that cause the computer system to perform operations including:

after detecting the first movement of the viewpoint of the user relative to the physical environment:

in accordance with a determination that the first movement satisfies a non-zero time threshold, moving the first user interface object in the three-dimensional environment to a same position relative to the viewpoint of the user.

25. The non-transitory computer readable storage medium of claim 24, wherein the first user interface object moves within the three-dimensional environment in accordance with movement of the user.

26. The non-transitory computer readable storage medium of claim 21, the one or more programs further comprising instructions that cause the computer system to perform operations including:

receiving a user input to reposition the first user interface object in the three-dimensional environment;

in response to receiving the user input to reposition the first user interface object in the three-dimensional environment, repositioning the first user interface object to a respective position in the three-dimensional environment in accordance with the user input; and after repositioning the first user interface object to the respective position in the three-dimensional environment in accordance with the user input, detecting an input to change a viewpoint of the user; and in response to detecting the input to change the viewpoint of the user, changing the viewpoint of the user in accordance with the input to change the viewpoint of the user and displaying the first user interface object in the three-dimensional environment from a current viewpoint of the user, including:

in accordance with a determination that the first user interface object is positioned within a first predefined zone, displaying the first user interface object at a respective position that has a first spatial relationship to a first anchor position in the three-dimensional environment that corresponds to a location of the viewpoint of the user in the physical environment; and in accordance with a determination that the first user interface object is not positioned within the first predefined zone, maintaining display of the first user interface object at a same anchor position in the three-dimensional environment that does not correspond to a location of the user in the physical environment.

27. The non-transitory computer readable storage medium of claim 26, wherein the first predefined zone is selected from a plurality of predefined zones in the three-dimensional environment, and wherein:

the first predefined zone has the first spatial relationship relative to the first anchor position in the three-dimensional environment that corresponds to a location of the viewpoint of the user, and a second predefined zone of the plurality of predefined zones has a second spatial relationship relative to a second anchor position in the three-dimensional environment that corresponds to a location of the viewpoint of the user.

28. The non-transitory computer readable storage medium of claim 26, the one or more programs further comprising instructions that cause the computer system to perform operations including:

in response to detecting the user initiating the user input to reposition the first user interface object, displaying a visual indication for the first predefined zone; and while detecting the user input to reposition the first user interface object to the first predefined zone, maintaining display of the visual indication for the first predefined zone.

29. The non-transitory computer readable storage medium of claim 21, wherein the attention criteria with respect to the first user interface object includes a gaze criterion.

30. The non-transitory computer readable storage medium of claim 21, wherein the attention criteria with respect to the first user interface object includes a criterion for a position of the head of the user in the physical environment.

31. The non-transitory computer readable storage medium of claim 21, the one or more programs further comprising instructions that cause the computer system to perform operations including:
   detecting a pinch input directed to a first affordance displayed on at least a portion of the first user interface object followed by movement of a hand that performed the pinch input; and
   in response to the movement of the hand, changing a size of the first user interface object in accordance with the movement of the hand.

32. The non-transitory computer readable storage medium of claim 21, the one or more programs further comprising instructions that cause the computer system to perform operations including:
   receiving a pinch input with a first hand and a pinch input with a second hand directed to the first user interface object followed by a change in distance between the first hand and the second hand; and
   in response to the change in distance between the first hand and the second hand, changing a size of the first user interface object in accordance with the change in distance between the first hand and the second hand.

33. The non-transitory computer readable storage medium of claim 21, wherein deemphasizing the first user interface object relative to one or more other objects in the three-dimensional environment includes deemphasizing the first user interface object relative to one or more other virtual objects in the three-dimensional environment.

34. The non-transitory computer readable storage medium of claim 21, wherein deemphasizing the first user interface object relative to one or more other objects in the three-dimensional environment includes deemphasizing the first user interface object relative to representations of one or more physical objects in the physical environment.

35. The non-transitory computer readable storage medium of claim 21, wherein the first user interface object includes a plurality of selectable user interface objects.

36. The non-transitory computer readable storage medium of claim 21, the one or more programs further comprising instructions that cause the computer system to perform operations including:
   displaying one or more user interface objects for controlling an immersion level of the three-dimensional environment;
   in response to a user input directed to a first user interface object of the one or more user interface objects for increasing a level of immersion of the three-dimensional environment, displaying additional virtual content in the three-dimensional environment; and
   in response to detecting a user input directed to a second user interface object of the one or more user interface objects for decreasing a level of immersion of the three-dimensional environment, displaying additional content corresponding to the physical environment.

37. The non-transitory computer readable storage medium of claim 21, wherein an amount of deemphasizing the first user interface object relative to one or more other objects in the three-dimensional environment is based on an angle between a detected gaze of the user and the first user interface object.

38. The non-transitory computer readable storage medium of claim 21, wherein an amount of deemphasizing the first user interface object relative to one or more other objects in the three-dimensional environment is based on a rate of the first movement of the viewpoint of the user.

39. The non-transitory computer readable storage medium of claim 21, wherein, before and after the first movement of the viewpoint of the user relative to the physical environment, a respective characteristic position of the first user interface object in the three-dimensional environment has a first spatial relationship to a first anchor position in the three-dimensional environment that corresponds to a location of the viewpoint of the user in the physical environment.

40. The computer system of claim 20, wherein the first user interface object has a first spatial relationship to a first anchor position in the three-dimensional environment that corresponds to a location of the user in the physical environment.

41. The computer system of claim 20, the one or more programs further including instructions for, after detecting the first movement of the viewpoint of the user relative to the physical environment, maintaining display of the first user interface object at a same anchor position in the three-dimensional environment.

42. The computer system of claim 20, the one or more programs further including instructions for:
   after detecting the first movement of the viewpoint of the user relative to the physical environment:
      in accordance with a determination that the first movement satisfies a non-zero time threshold, moving the first user interface object in the three-dimensional environment to a same position relative to the viewpoint of the user.

43. The computer system of claim 42, wherein the first user interface object moves within the three-dimensional environment in accordance with movement of the user.

44. The computer system of claim 20, the one or more programs further including instructions for:
   receiving a user input to reposition the first user interface object in the three-dimensional environment;
   in response to receiving the user input to reposition the first user interface object in the three-dimensional environment, repositioning the first user interface object to a respective position in the three-dimensional environment in accordance with the user input; and
   after repositioning the first user interface object to the respective position in the three-dimensional environment in accordance with the user input, detecting an input to change a viewpoint of the user; and
   in response to detecting the input to change the viewpoint of the user, changing the viewpoint of the user in accordance with the input to change the viewpoint of the user and displaying the first user interface object in the three-dimensional environment from a current viewpoint of the user, including:
      in accordance with a determination that the first user interface object is positioned within a first predefined zone, displaying the first user interface object at a respective position that has a first spatial relationship to a first anchor position in the three-dimensional environment that corresponds to a location of the viewpoint of the user in the physical environment; and in accordance with a determination that the first user interface object is not positioned within the first predefined zone, maintaining display of the first user interface object at a same anchor position in the three-dimensional environment that does not correspond to a location of the user in the physical environment.

45. The computer system of claim 44, wherein the first predefined zone is selected from a plurality of predefined zones in the three-dimensional environment, and wherein:

the first predefined zone has the first spatial relationship relative to the first anch or position in the three-dimensional environment that corresponds to a location of the viewpoint of the user, and a second predefined zone of the plurality of predefined zones has a second spatial relationship relative to a second anchor position in the three-dimensional environment that corresponds to a location of the viewpoint of the user.

46. The computer system of claim 44, the one or more programs further including instructions for:

in response to detecting the user initiating the user input to reposition the first user interface object, displaying a visual indication for the first predefined zone; and while detecting the user input to reposition the first user interface object to the first predefined zone, maintaining display of the visual indication for the first predefined zone.

47. The computer system of claim 20, wherein the attention criteria with respect to the first user interface object includes a gaze criterion.

48. The computer system of claim 20, wherein the attention criteria with respect to the first user interface object includes a criterion for a position of the head of the user in the physical environment.

49. The computer system of claim 20, the one or more programs further including instructions for:

detecting a pinch input directed to a first affordance displayed on at least a portion of the first user interface object followed by movement of a hand that performed the pinch input; and in response to the movement of the hand, changing a size of the first user interface object in accordance with the movement of the hand.

50. The computer system of claim 20, the one or more programs further including instructions for:

receiving a pinch input with a first hand and a pinch input with a second hand directed to the first user interface object followed by a change in distance between the first hand and the second hand; and in response to the change in distance between the first hand and the second hand, changing a size of the first user interface object in accordance with the change in distance between the first hand and the second hand.

51. The computer system of claim 20, wherein deemphasizing the first user interface object relative to one or more other objects in the three-dimensional environment includes deemphasizing the first user interface object relative to one or more other virtual objects in the three-dimensional environment.

52. The computer system of claim 20, wherein deemphasizing the first user interface object relative to one or more other objects in the three-dimensional environment includes deemphasizing the first user interface object relative to representations of one or more physical objects in the physical environment.

53. The computer system of claim 20, wherein the first user interface object includes a plurality of selectable user interface objects.

54. The computer system of claim 20, the one or more programs further including instructions for:

displaying one or more user interface objects for controlling an immersion level of the three-dimensional environment;

in response to a user input directed to a first user interface object of the one or more user interface objects for increasing a level of immersion of the three-dimensional environment, displaying additional virtual content in the three-dimensional environment; and in response to detecting a user input directed to a second user interface object of the one or more user interface objects for decreasing a level of immersion of the three-dimensional environment, displaying additional content corresponding to the physical environment.

55. The computer system of claim 20, wherein an amount of deemphasizing the first user interface object relative to one or more other objects in the three-dimensional environment is based on an angle between a detected gaze of the user and the first user interface object.

56. The computer system of claim 20, wherein an amount of deemphasizing the first user interface object relative to one or more other objects in the three-dimensional environment is based on a rate of the first movement of the viewpoint of the user.

57. The computer system of claim 20, wherein, before and after the first movement of the viewpoint of the user relative to the physical environment, a respective characteristic position of the first user interface object in the three-dimensional environment has a first spatial relationship to a first anchor position in the three-dimensional environment that corresponds to a location of the viewpoint of the user in the physical environment.

* * * * *